United States Patent
Park et al.

(10) Patent No.: US 12,069,715 B2
(45) Date of Patent: Aug. 20, 2024

(54) METHOD FOR TRANSMITTING AND RECEIVING UPLINK FOR PLURALITY OF TRPs AND DEVICE FOR SAME

(71) Applicant: LG ELECTRONICS INC., Seoul (KR)

(72) Inventors: Haewook Park, Seoul (KR); Hyungtae Kim, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/374,521

(22) Filed: Sep. 28, 2023

(65) Prior Publication Data

US 2024/0032088 A1 Jan. 25, 2024

Related U.S. Application Data

(63) Continuation of application No. 17/968,473, filed on Oct. 18, 2022, now Pat. No. 11,800,555, which is a (Continued)

(30) Foreign Application Priority Data

Apr. 29, 2020 (KR) .................. 10-2020-0052790

(51) Int. Cl.
*H04B 7/06* (2006.01)
*H04W 72/23* (2023.01)
(Continued)

(52) U.S. Cl.
CPC ........ *H04W 72/563* (2023.01); *H04B 7/0639* (2013.01); *H04W 72/23* (2023.01); *H04W 72/51* (2023.01)

(58) Field of Classification Search
CPC .. H04B 7/0486; H04B 7/0689; H04B 7/0456; H04B 7/024; H04B 7/0639;
(Continued)

(56) References Cited

U.S. PATENT DOCUMENTS

2019/0174527 A1 6/2019 Park et al.
2019/0199553 A1 6/2019 Park et al.
(Continued)

FOREIGN PATENT DOCUMENTS

CN 102166714 A 8/2011
CN 109995497 A 7/2019
(Continued)

OTHER PUBLICATIONS

Ericsson, "On PDCCH, PUCCH and PUSCH enhancements for multi-TRP", 3GPP TSG-RAN WG1 Meeting #104bis-e R1-2103550, eMeeting, Apr. 12-20, 2021.
(Continued)

*Primary Examiner* — Chi Ho A Lee
(74) *Attorney, Agent, or Firm* — BRYAN CAVE LEIGHTON PAISNER LLP

(57) ABSTRACT

The present invention relates to NR communication. A method for a user equipment provided with a plurality of panels or antennas to transmit an uplink signal to a plurality of transmission reception points (TRPs) comprises the steps of: receiving Downlink Control Indicators (DCI) including first to n-th field values; and transmitting identical uplink data to the plurality of TRPs by using the same number of antenna ports on the basis of the DCIs, wherein the first field value among the first to n-th field values may be determined on the basis of a Transmission Rank Indicator (TRI) and a Transmit Precoder Matrix Indicator (TPMI) corresponding to the selected first TRP among the plurality of TRPs, the second to n-th field values may be determined on the basis
(Continued)

of second to n-th TPMIs respectively corresponding to the remaining second to n-th TRPs other than the selected first TRP, and the TRIs corresponding to the second to n-th field values may be determined on the basis of the TRI in the first field value.

17 Claims, 21 Drawing Sheets

Related U.S. Application Data continuation of application No. PCT/KR2021/005431, filed on Apr. 29, 2021.

(51) Int. Cl.
*H04W 72/51* (2023.01)
*H04W 72/563* (2023.01)

(58) Field of Classification Search
CPC ....... H04L 5/0023; H04L 5/0057; H04L 1/08; H04L 5/0053; H04W 72/563; H04W 72/51; H04W 72/232; H04W 72/23; H04W 72/1268; H04W 52/42
See application file for complete search history.

(56) References Cited

U.S. PATENT DOCUMENTS

| | | | |
|---|---|---|---|
| 2019/0327693 A1 | 10/2019 | Rahman et al. | |
| 2020/0083939 A1 | 3/2020 | Park et al. | |
| 2020/0106559 A1* | 4/2020 | Vilaipornsawai | H04L 1/1896 |
| 2020/0107353 A1 | 4/2020 | Jung et al. | |
| 2020/0367217 A1* | 11/2020 | Wang | H04L 5/0094 |
| 2021/0243751 A1* | 8/2021 | Saber | H04L 5/0091 |
| 2021/0273692 A1* | 9/2021 | Gao | H04B 7/0456 |
| 2022/0368386 A1* | 11/2022 | Brown | H04B 7/0626 |
| 2022/0394748 A1* | 12/2022 | Shi | H04W 72/1268 |
| 2023/0026606 A1* | 1/2023 | Yuan | H04B 7/0404 |
| 2023/0076139 A1* | 3/2023 | Muruganathan | H04L 5/0048 |
| 2023/0216626 A1* | 7/2023 | Muruganathan | H04L 1/08 370/328 |

FOREIGN PATENT DOCUMENTS

| | | |
|---|---|---|
| CN | 110535614 A | 12/2019 |
| CN | 115485983 B | 4/2024 |
| JP | 2020-509677 A | 3/2020 |
| WO | 2019/244207 A1 | 12/2019 |

OTHER PUBLICATIONS

ZTE, "Further details on Multi-beam and Multi-TRP operation", 3GPP TSG RAN WG1 Meeting #104-e R1-2100292, e-Meeting, Jan. 25-Feb. 4, 2020.

OPPO, "Discussion on Rel-16 eMIMO UE features", 3GPP TSG RAN WG1 #100bis R1-2001738, e-Meeting, Apr. 20-30, 2020.

Apple Inc., "On Beam Management Enhancement", 3GPP TSG-RAN WG1 Meeting #103-e R1-2008438, e-Meeting, Oct. 26-Nov. 13, 2020.

MediaTek Inc., "Views on Rel-16 UE Features for NR eMIMO", 3GPP TSG RAN WG1 Meeting #100bis R1-2001829, e-Meeting, Apr. 20-30, 2020.

Huawei, HiSilicon, "On the enhancement of SRS carrier switching capability", 3GPP TSG-RAN WG2 Meeting #108 R2-1915262, Reno, USA, Nov. 18-22, 2019.

MediaTek Inc., "Codebook based transmission for UL", 3GPP TSG RAN WG1 Meeting NR#3 R1-1716785, Nagoya, Japan, Sep. 18-21, 2017.

Xinwei, "Views on NR Reference Signals for Beam and CSI measurement", 3GPP TSG RAN WG1 Meeting #86b R1-1609695, Lisbon, Portugal, Oct. 10-14, 2016.

Catt, "Considerations on multi-TRP/panel transmission", 3GPP TSG RAN WG1 #98bis R1-1910349, Chongqing, China, Oct. 14-20, 2019.

MediaTek Inc., "Further Considerations on NR 'Cell'", 3GPP TSG-RAN WG2 Meeting #95bis R2-166103, Kaohsiung, Taiwan, Oct. 10-14, 2016.

Vivo, "Evaluation on MTRP CSI and Partial reciprocity", 3GPP TSG RAN WG1 #102-e R1-2005369, e-Meeting, Aug. 17-28, 2020.

\* cited by examiner

FIG. 5
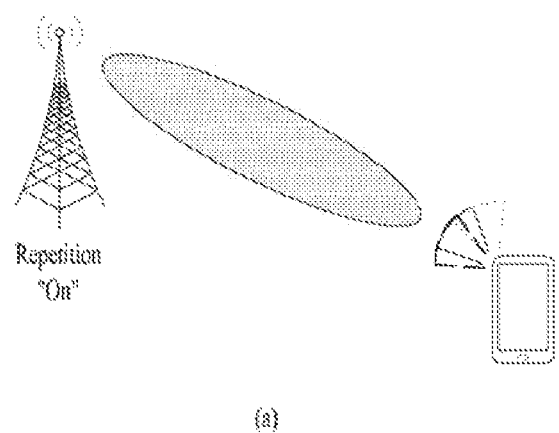
(a)
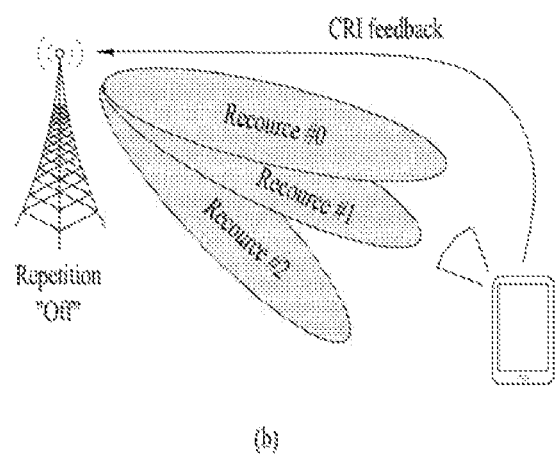
(b)

METHOD FOR TRANSMITTING AND RECEIVING UPLINK FOR PLURALITY OF TRPs AND DEVICE FOR SAME

CROSS-REFERENCE TO RELATED APPLICATIONS

This application is a Continuation of U.S. patent application Ser. No. 17/968,473, filed Oct. 18, 2022, which is a Continuation Bypass of International Application No. PCT/KR2021/005431, filed on Apr. 29, 2021, which claims priority of Korean Application No. 10-2020-0052790, filed on Apr. 29, 2020, which are hereby incorporated by reference in its entirety.

TECHNICAL FIELD

The disclosure relates to an uplink transmission/reception technology in new radio (NR), and more particularly, to a technique for transmitting an uplink signal to a plurality of transmission reception points (TRPs) by a user equipment (UE).

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system and multi carrier frequency division multiple access (MC-FDMA) system, etc.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

In legacy NR, a UE equipped with multiple antennas/panels does not support codebook-based uplink transmission for a plurality of TRPs.

When uplink transmission for a plurality of TRPs is supported, signaling payload increases, compared to existing uplink transmission for a single TRP.

DISCLOSURE

Technical Problem

An object to be achieved is to provide a method of transmitting/receiving an uplink signal for a plurality of TRPs, and an apparatus therefor.

Another object to be achieved is to provide a method of transmitting and receiving an uplink signal and an apparatus therefor, which may decrease downlink control information (DCI) overhead for uplink transmission for a plurality of transmission reception points (TRPs) in new radio (NR).

It will be appreciated by persons skilled in the art that the objects that could be achieved with the disclosure are not limited to what has been particularly described hereinabove and the above and other objects that the disclosure could achieve will be more clearly understood from the following detailed description.

Technical Solution

According to an aspect, a method of transmitting an uplink signal to a plurality of transmission reception points (TRPs) by a user equipment (UE) including a plurality of panels or antennas may include receiving a downlink control indicator (DCI) including first to $n^{th}$ field values, and transmitting the same uplink data using the same number of antenna ports to the plurality of TRPs based on the DCI. The first field value among the first to $n^{th}$ field values may be determined based on a transmission rank indicator (TRI) and a transmit precoder matrix indicator (TPMI) corresponding to a first TRP selected from among the plurality of TRPs, the second to $n^{th}$ field values may be determined based on the second to $n^{th}$ TPMIs corresponding respectively to the remaining second to $n^{th}$ TRPs except for the selected first TRP, and TRIs corresponding to the second to $n^{th}$ TRPs may be determined based on a TRI in the first field value.

According to an embodiment, the method may further include transmitting capability information about the UE to at least one of the plurality of TRPs, and receiving configuration information related to transmission and reception based on the plurality of TRPs.

According to an embodiment, the capability information about the UE may include at least one of information about the number of antenna ports supported by the UE, information about the number of antenna ports for each panel provided in the UE, information about a coherency capability, information about an full power transmission capability, information about a supported full transmission mode, information about a supported TPMI group, information about a port switching capability, information about a transmission chain, information indicating whether transmission based on a plurality of TRPs is supported, information about the number of transmittable sounding reference signals (SRS), or information about supported multiplexing.

According to an embodiment, the configuration information related to the transmission and reception based on the plurality of TRPs may include at least one of configuration information for the plurality of TRPs at a network side, resource allocation information for the transmission and reception based on the plurality of TRPs, system information, information about a scheduling scheme, or physical uplink shared channel (PUSCH) allocation information for transmission of the uplink data.

According to an embodiment, the configuration information related to the transmission and reception based on the plurality of TRPs may include information related to codeblock subset restriction or codeblock subsampling.

According to an embodiment, a code block subset may be limited based on a TPMI index value, and the codeblock subsampling may be performed based on a rank or based on co-phasing between ports/port groups.

According to an embodiment, the configuration information may be received by higher layer signaling.

According to an embodiment, the DCI may further include an SRS resource indicator (SRI) field indicating an SRS resource configured in an SRS resource set corresponding to each of the plurality of TRPs.

According to an embodiment, a size of second to $n^{th}$ fields may be determined based on a largest of the numbers of per-rank TPMIs corresponding to the TRI.

According to an embodiment, a TRP corresponding to a lowest index or identifier (ID) may be determined as the first TRP to which the TRI is to be indicated, based on at least one of Coresetpoolindex, CoresetID, or TCI state ID associated with the plurality of TRPs.

According to an embodiment, the method may further include transmitting an SRS to the plurality of TRPs. A TRP having a best uplink channel state among the plurality of TRPs may be determined as the first TRP, and the TRIs corresponding to the second to $n^{th}$ TRPs may be predefined to have values less than the TRI corresponding to the first TRP.

According to another aspect, a UE for transmitting an uplink signal to a plurality of TRPs may include a transceiver configured to transmit and receive signals to and from the plurality of TRPs through a plurality of panels or antennas, and a processor connected to the transceiver. The processor may be configured to receive a DCI including first to $n^{th}$ field values, and transmit the same uplink data using the same number of antenna ports to the plurality of TRPs based on the DCI. The first field value among the first to $n^{th}$ field values may be determined based on a TRI and a TPMI corresponding to a first TRP selected from among the plurality of TRPs, the second to $n^{th}$ field values may be determined based on the second to $n^{th}$ TPMIs corresponding respectively to the remaining second to $n^{th}$ TRPs except for the selected first TRP, and TRIs corresponding to the second to $n^{th}$ TRPs may be determined based on a TRI in the first field value.

According to an embodiment, the processor may be configured to transmit capability information about the UE to at least one of the plurality of TRPs, and receive configuration information related to transmission and reception based on the plurality of TRPs.

According to an embodiment, the processor may be configured to receive the configuration information by higher layer signaling.

According to an embodiment, the processor may be configured to transmit an SRS to the plurality of TRPs, a TRP having a best uplink channel state among the plurality of TRPs may be determined as the first TRP, and the TRIs corresponding to the second to $n^{th}$ TRPs may be predefined to have values less than the TRI corresponding to the first TRP.

According to another aspect, a method of receiving an uplink signal at a plurality of TRPs may include transmitting a DCI including first to $n^{th}$ field values to at least one of the plurality of TRPs, and receiving the same uplink data through the plurality of TRPs. The first field value among the first to $n^{th}$ field values may be determined based on a TRI and a TPMI corresponding to a first TRP selected from among the plurality of TRPs, the second to $n^{th}$ field values may be determined based on the second to $n^{th}$ TPMIs corresponding respectively to the remaining second to $n^{th}$ TRPs except for the selected first TRP, and TRIs corresponding to the second to $n^{th}$ TRPs may be determined based on a TRI in the first field value.

According to another aspect, an apparatus for receiving an uplink signal at a plurality of TRPs may include a transceiver configured to transmit and receive signals to and from a UE, and a processor connected to the transceiver. The processor may be configured to transmit a DCI including first to $n^{th}$ field values to at least one of the plurality of TRPs, and receive the same uplink data through the plurality of TRPs. The first field value among the first to $n^{th}$ field values may be determined based on a TRI and a TPMI corresponding to a first TRP selected from among the plurality of TRPs, the second to $n^{th}$ field values may be determined based on the second to $n^{th}$ TPMIs corresponding respectively to the remaining second to $n^{th}$ TRPs except for the selected first TRP, and TRIs corresponding to the second to $n^{th}$ TRPs may be determined based on a TRI in the first field value.

According to another aspect, a processor for performing operations for a UE including a plurality of panels or antennas, for transmitting an uplink signal to a plurality of TRPs may be provided. The operations may include receiving a DCI including first to $n^{th}$ field values, and transmitting the same uplink data using the same number of antenna ports to the plurality of TRPs based on the DCI. The first field value among the first to $n^{th}$ field values may be determined based on a TRI and a TPMI corresponding to a first TRP selected from among the plurality of TRPs, the second to $n^{th}$ field values may be determined based on the second to $n^{th}$ TPMIs corresponding respectively to the remaining second to $n^{th}$ TRPs except for the selected first TRP, and TRIs corresponding to the second to $n^{th}$ TRPs may be determined based on a TRI in the first field value.

According to another aspect, a non-volatile computer-readable storage medium storing at least one computer program including instructions which when executed by at least one processor, enable the at least one processor to perform operations for a UE may be provided. The operations may include receiving a DCI including first to $n^{th}$ field values, and transmitting the same uplink data using the same number of antenna ports to the plurality of TRPs based on the DCI. The first field value among the first to $n^{th}$ field values may be determined based on a TRI and a TPMI corresponding to a first TRP selected from among the plurality of TRPs, the second to $n^{th}$ field values may be determined based on the second to $n^{th}$ TPMIs corresponding respectively to the remaining second to $n^{th}$ TRPs except for the selected first TRP, and TRIs corresponding to the second to $n^{th}$ TRPs may be determined based on a TRI in the first field value.

According to another aspect, a method of transmitting an uplink signal to a plurality of TRPs by a UE including a plurality of panels or antennas may include receiving a DCI including a plurality of SRI field values, and transmitting non-codebook-based uplink data using the same number of antenna ports to the plurality of TRPs based on the DCI. A first SRI field value among the plurality of SRI field values may be determined by bit-mapping of a TRI corresponding to a first TRP selected from among the plurality of TRPs and an SRS resource combination corresponding to the first TRP, remaining SRI field values except for the first SRI field value may be determined by bit-mapping of only SRS resource combinations corresponding respectively to second to $n^{th}$ TRPs except for the selected first TRP, and TRIs corresponding to second to $n^{th}$ SRI field values may be determined based on a TRI corresponding to the first SRI field value.

According to an embodiment, a size of remaining SRI fields may be determined based on a largest of the numbers of per-rank SRS resource combinations available for the TRI.

Advantageous Effects

The disclosure advantageously provides an uplink transmission/reception method for a plurality of TRPs in new radio (NR), and an apparatus therefor.

In addition, the disclosure advantageously provides a codebook-based uplink transmission/reception method and an apparatus therefor, which may reduce downlink control information (DCI) overhead, when an uplink signal for a plurality of TRPs is transmitted.

In addition, the disclosure advantageously provides a non-codebook-based uplink transmission/reception method and an apparatus therefor, which may reduce DCI overhead, when an uplink signal for a plurality of TRPs is transmitted.

In addition, the disclosure advantageously provide an uplink transmission/reception method for a plurality of TRPs and an apparatus therefor, which may optimize uplink transmission to the plurality of TRPs by adaptively allocating codebook-based or non-codebook-based uplink resources according to a radio channel state and a UE capability.

It will be appreciated by persons skilled in the art that the effects that could be achieved with the disclosure are not limited to what has been particularly described hereinabove and other advantages of the disclosure will be more clearly understood from the following detailed description.

BRIEF DESCRIPTION OF THE DRAWINGS

The accompanying drawings are provided to provide an understanding of the disclosure, and are intended to illustrate various embodiments of the disclosure and, together with the description of the specification, explain the principles of the disclosure.

FIG. 5 is a diagram illustrating an exemplary downlink (DL) BM procedure using a channel state information-reference signal (CSI-RS) in an NR environment.

BEST MODE

Figure 1:
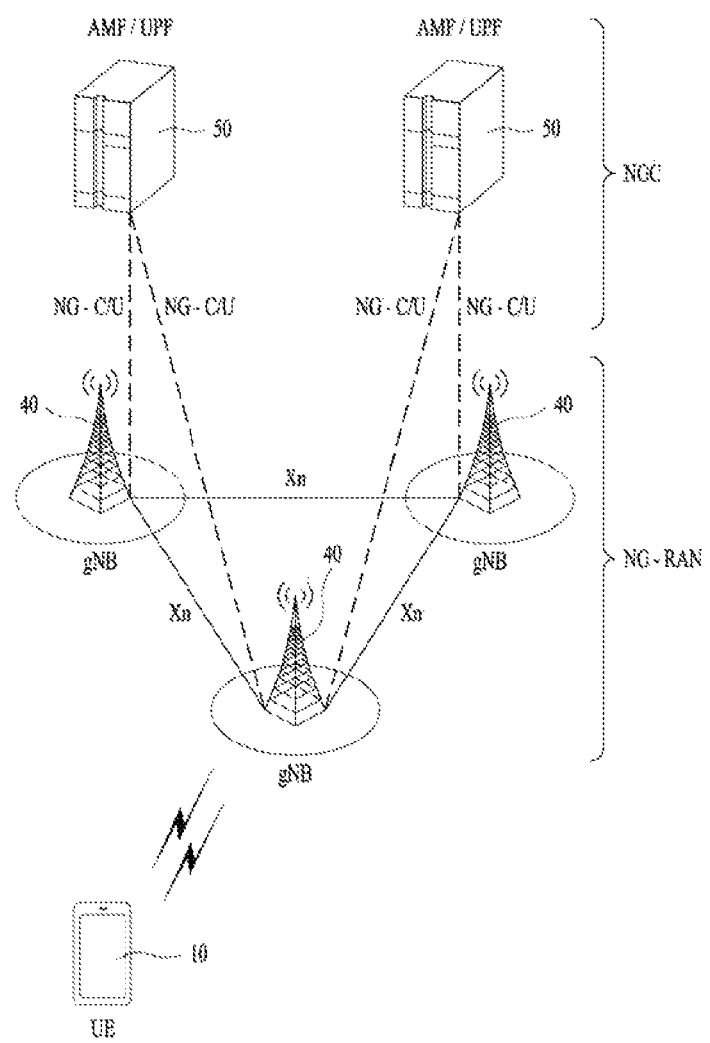
FIG. 1 is a diagram illustrating the structure of a new radio (NR) system.

According to an aspect, a method of transmitting an uplink signal to a plurality of transmission reception points (TRPs) by a user equipment (UE) including a plurality of panels or antennas may include receiving a downlink control indicator (DCI) including first to $n^{th}$ field values, and transmitting the same uplink data using the same number of antenna ports to the plurality of TRPs based on the DCI. The first field value among the first to $n^{th}$ field values may be determined based on a transmission rank indicator (TRI) and a transmit precoder matrix indicator (TPMI) corresponding to a first TRP selected from among the plurality of TRPs, the second to $n^{th}$ field values may be determined based on the second to $n^{th}$ TPMIs corresponding respectively to the remaining second to $n^{th}$ TRPs except for the selected first TRP, and TRIs corresponding to the second to $n^{th}$ TRPs may be determined based on a TRI in the first field value.

MODE FOR CARRYING OUT THE INVENTION

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

Although the disclosure is described based on 3GPP communication systems (e.g., LTE-A, NR, etc.) for clarity of description, the spirit of the disclosure is not limited thereto. LTE refers to technologies beyond 3GPP technical specification (TS) 36.xxx Release 8. In particular, LTE technologies beyond 3GPP TS 36.xxx Release 10 are referred to as LTE-A, and LTE technologies beyond 3GPP TS 36.xxx Release 13 are referred to as LTE-A pro. 3GPP NR refers to technologies beyond 3GPP TS 38.xxx Release 15. LTE/NR may be called '3GPP system'. Herein, "xxx" refers to a standard specification number. For backgrounds, terms, abbreviations, etc. used in the description of the disclosure, reference may be made to matters described in standard documents published before the present invention. For example, you can refer to the following documents:

3GPP LTE
36.211: Physical channels and modulation
36.212: Multiplexing and channel coding
36.213: Physical layer procedures
36.300: Overall description
36.331: Radio Resource Control (RRC)

3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification Definition and Abbreviations BM: beam management
CQI: channel quality indicator
CRI: CSI-RS (channel state information-reference signal) resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
TPMI: transmit precoder matrix indicator
RE: resource element
RI: Rank indicator
RRC: radio resource control
RSSI: received signal strength indicator
Rx: Reception
SRS: Sounding Reference Signal
SRI: SRS resource indicator
QCL: quasi co-location
SINR: signal to interference and noise ratio
SSB (or SS/PBCH block): synchronization signal block (including primary synchronization signal, secondary synchronization signal and physical broadcast channel)
TDM: time division multiplexing
TRP: transmission and reception point
TRS: tracking reference signal
Tx: transmission
UE: user equipment
ZP: zero power Hereinafter, 5G NR communication will be briefly described.

As more and more communication devices demand larger communication capacities, the need for enhanced mobile broadband communication relative to the legacy radio access technologies (RATs) has emerged. Massive machine type communication (mMTC) that provides various services by interconnecting multiple devices and things irrespective of time and place is also one of main issues to be addressed for future-generation communications. A communication system design considering services/user equipments (UEs) sensitive to reliability and latency is under discussion as well. As such, the introduction of a future-generation RAT considering enhanced mobile broadband (eMBB), mMTC, ultra-reliability and low latency communication (URLLC), and so on is being discussed. For convenience, this technology is referred to as new RAT (NR) in the disclosure. NR is an exemplary 5th generation (5G) RAT.

A new RAT system including NR adopts orthogonal frequency division multiplexing (OFDM) or a similar transmission scheme. The new RAT system may use OFDM parameters different from long term evolution (LTE) OFDM parameters. Further, the new RAT system may have a larger system bandwidth (e.g., 100 MHz), while following the legacy LTE/LTE-advanced (LTE-A) numerology. Further, one cell may support a plurality of numerologies in the new RAT system. That is, UEs operating with different numerologies may co-exist within one cell.

Numerology corresponds to one subcarrier spacing in the frequency domain. By scaling the reference subcarrier spacing by an integer N, different numerology may be defined.

The three main requirement areas for 5G include (1) Enhanced Mobile Broadband (eMBB) area, (2) massive Machine Type Communication (mMTC) area, and (3) Ultra-reliable and Low Latency Communications (URLLC) area.

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 illustrates the structure of an NR system.

Figure 4:
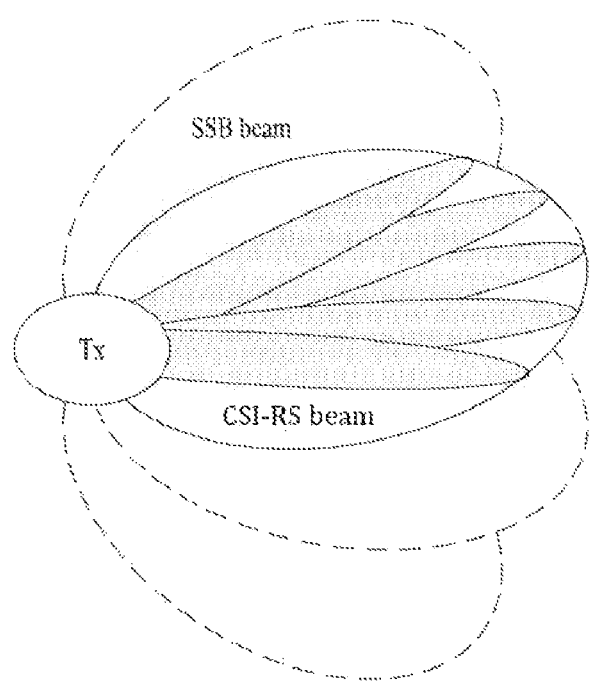
FIG. 4 is a diagram illustrating beam management (BM) in an NR environment.

Referring to FIG. 1, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

A gNB and/or eNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 2:
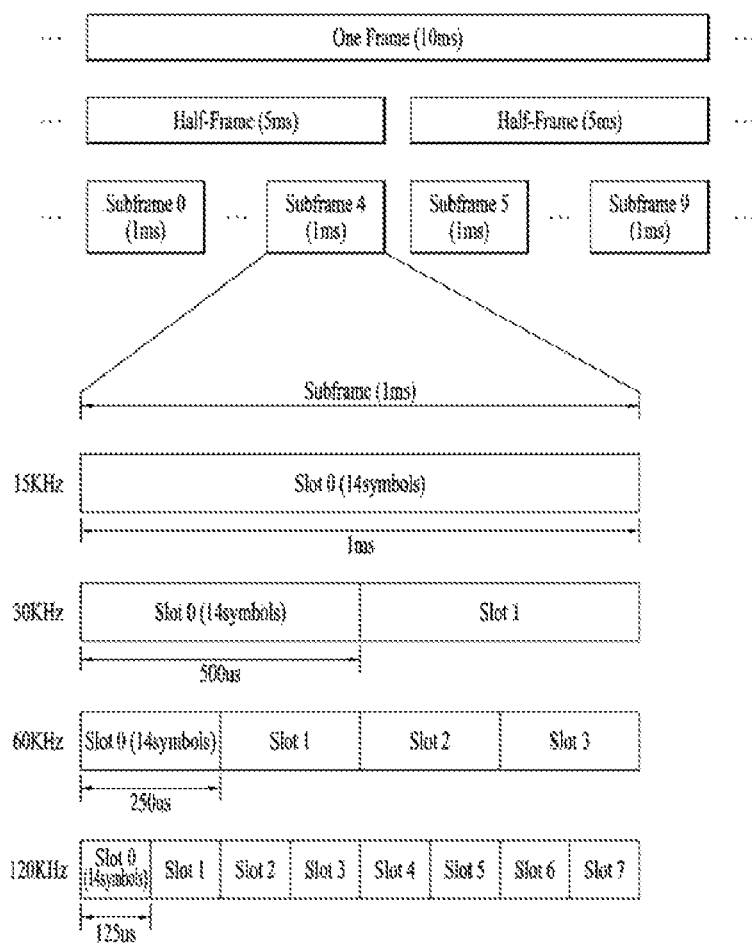
FIG. 2 is a diagram illustrating the structure of an NR radio frame.

FIG. 2 illustrates a radio frame structure in NR.

Referring to FIG. 2, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration µ in the NCP case.

TABLE 1

| SCS (15 * 2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells. In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise. An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4].

That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 3:
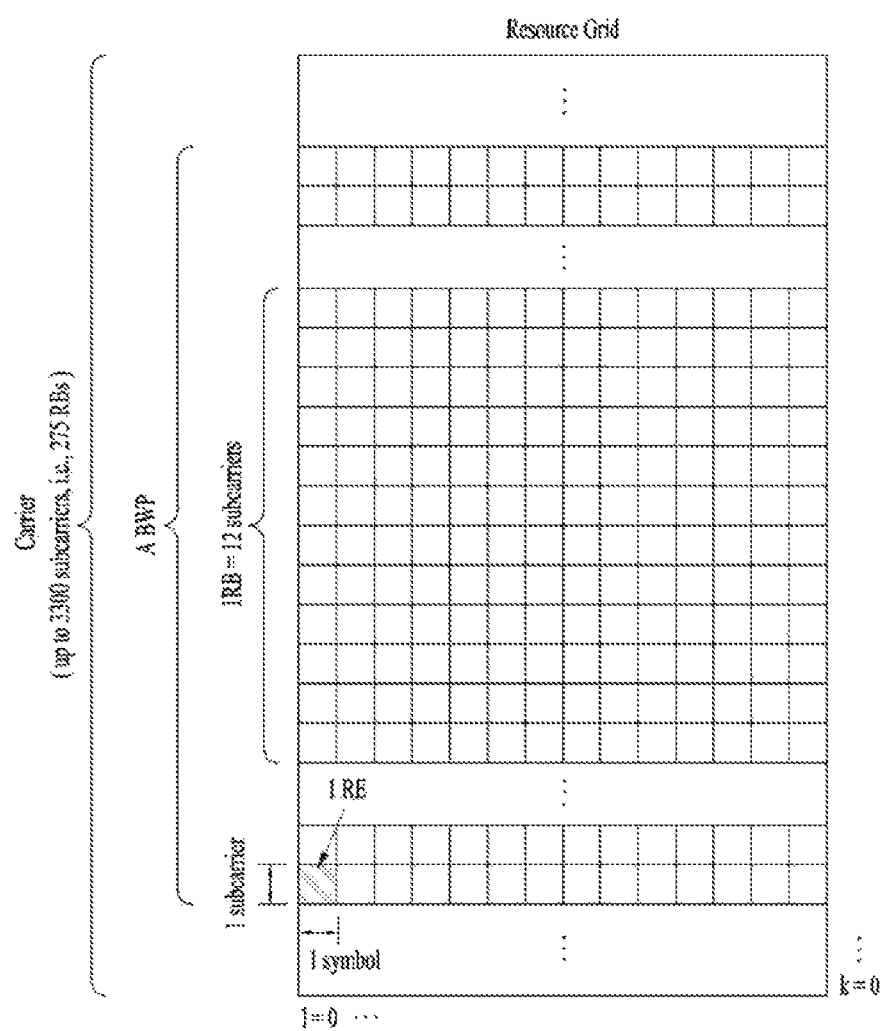
FIG. 3 is a diagram illustrating a slot structure in an NR frame.

FIG. 3 illustrates a slot structure in an NR frame.

Referring to FIG. 3, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the disclosure, L1 may refer to the PHY layer. For example, L2 may refer to at least one of the MAC layer, the RLC layer, the PDCH layer, or the SDAP layer. For example, L3 may refer to the RRC layer.

FIG. 4 is a diagram illustrating beam management (BM) in an NR environment.

BM is a series of layer 1 (L1)/layer 2 (L2) procedures for acquiring and maintaining a set of BS (e.g., gNBs, TRPs, or the like) beams and/or UE beams available for DL and UL transmission/reception. BM may include the following processes and terminology.

Beam measurement: the BS or the UE measures the characteristics of a received beamformed signal.

Beam determination: the BS or the UE selects its transmission (Tx) beam/reception (Rx) beam.

Beam sweeping: a spatial area is covered by using Tx beams and/or Rx beams in a predetermined manner during a predetermined time interval.

Beam report: the UE reports information about a beamformed signal based on a beam measurement.

The BM procedure may be divided into (1) a DL BM procedure using a synchronization signal (SS)/physical broadcast channel (PBCH) block or CSI-RS, and (2) a UL BM procedure using a sounding reference signal (SRS).

Further, each BM procedure may include Tx beam sweeping for determining a Tx beam and Rx beam sweeping for determining an Rx beam.

The DL BM procedure may include (1) transmission of a beamformed DL RS (e.g., CSI-RS or SS block (SSB)) from the BS and (2) beam reporting from the UE. A beam report may include preferred DL RS ID(s) and L1-reference signal received power(s) (L1-RSRP(s)) corresponding to the preferred DL RS ID(s).

A DL RS ID may be an SSB resource indicator (SSBRI) or a CSI-RS resource indicator (CRI).

As illustrated in FIG. 4, an SSB beam and a CSI-RS beam may be used for beam measurement. A measurement metric is the L1-RSRP of each resource/block. The SSB may be used for coarse beam measurement, whereas the CSI-RS may be used for fine beam measurement. The SSB may be used for both Tx beam sweeping and Rx beam sweeping.

SSB-based Rx beam sweeping may be performed by changing an Rx beam across multiple SSB bursts at a UE. One SS burst includes one or more SSBs, and one SS burst set includes one or more SSB bursts FIG. 5 is a diagram illustrating an exemplary DL BM procedure using a CSI-RS in NR.

The CSI-RS serves the following purposes: i) when a parameter, repetition is configured and TRS_info is not configured for a specific CSI-RS resource set, the CSI-RS is used for BM; ii) when repetition is not configured and TRS_info is configured for the specific CSI-RS resource set, the CSI-RS is used for a tracking reference signal (TRS); and iii) when either of Repetition or TRS_info is not configured for the specific CSI-RS resource set, the CSI-RS is used for CSI acquisition.

This parameter, repetition may be configured only for CSI-RS resource sets associated with CSI-ReportConfig having a report of L1 RSRP or 'No Report (or None)'.

When the UE receives CSI-ReportConfig with reportQuantity set to 'cri-RSRP' or 'none', and CSI-ResourceConfig (a higher layer parameter, resourcesForChannelMeasurement) for channel measurement does not include a higher layer parameter 'trs-Info' and includes NZP-CSI-RS-ResourceSet with a higher layer parameter 'repetition' set, the UE may be configured only with ports (one or two ports) of the same number, having a higher layer parameter 'nrofPorts' for all CSI-RS resources in NZP-CSI-RS-ResourceSet.

When (the higher layer parameter) repetition is set to 'ON', this is related to the Rx beam sweeping procedure of the UE. In this case, when the UE is configured with NZP-CSI-RS-ResourceSet, the UE may assume that at least one CSI-RS resource within NZP-CSI-RS-ResourceSet is transmitted through the same DL spatial domain filter. That is, the at least one CSI-RS resource within NZP-CSI-RS-ResourceSet is transmitted on the same Tx beam. The at least one CSI-RS resource within NZP-CSI-RS-ResourceSet may be transmitted in different OFDM symbols. Further, the UE does not expect to receive different periodicities in periodicityAndOffset in all CSI-RS resources within NZP-CSI-RS-Resourceset.

On the contrary, when repetition is set to 'OFF', this is related to the Tx beam sweeping procedure of the BS. In the case where repetition is set to 'OFF', the UE does not assume that at least one CSI-RS resource within NZP-CSI-RS-ResourceSet is transmitted through the same DL spatial domain filter. That is, the at least one CSI-RS resource within NZP-CSI-RS-ResourceSet is transmitted on different Tx beams.

Referring to FIG. 5, FIG. 5(a) illustrates an Rx beam determination (or refinement) procedure of a UE, and FIG. 5(b) illustrates a Tx beam sweeping procedure of a BS. In addition, repetition is set to 'ON' in the illustrated case of FIG. 5(a), and repetition is set to 'OFF' in the illustrated case of FIG. 5(b).

Figure 6:
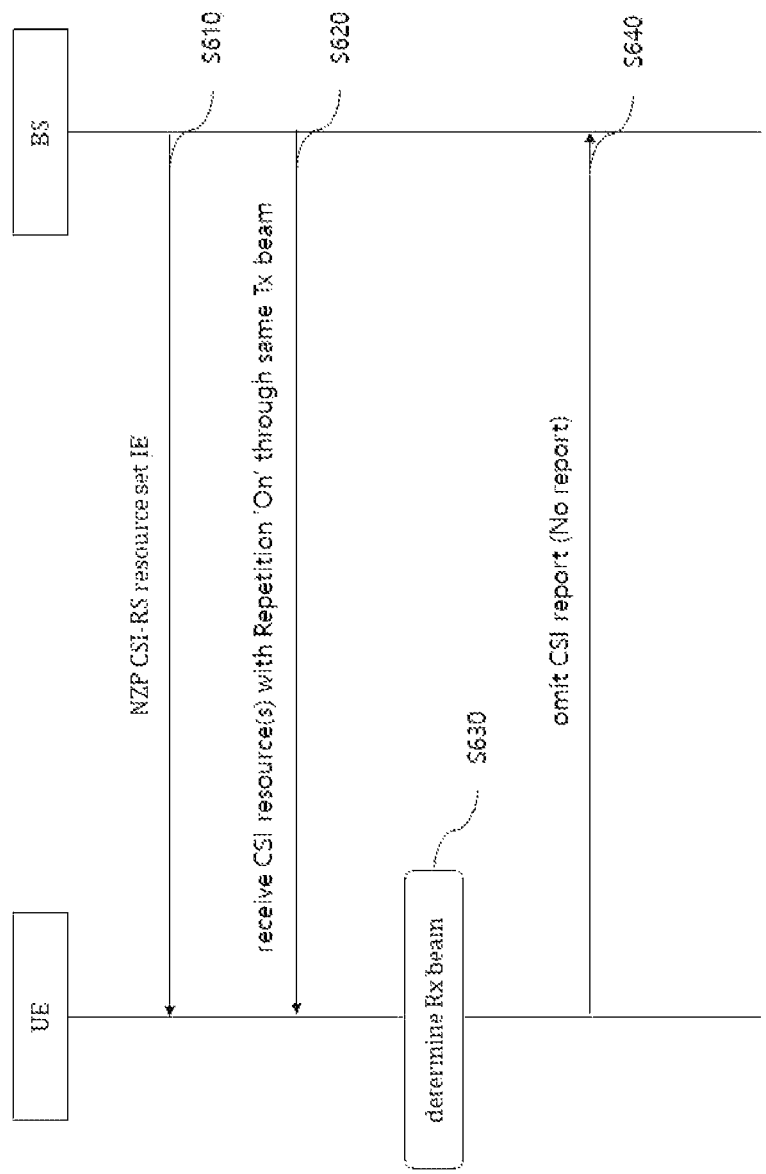
FIG. 6 is a diagram illustrating a signal flow for an exemplary process of determining a reception beam at a user equipment (UE).

With reference to FIG. 5(a) and FIG. 6 to be described later, the Rx beam determination procedure of the UE will be described.

FIG. 6 is a diagram illustrating a signal flow for an exemplary Rx beam determination procedure of a UE.

Referring to FIG. 6, the UE receives an NZP CSI-RS resource set IE including a higher layer parameter, repetition from a BS by RRC signaling (S610). Repetition is set to 'ON'.

The UE repeatedly receives resource(s) of the CSI-RS resource set with repetition set to 'ON' in different OFDM symbols through the same Tx beam (or DL spatial domain transmission filter) of the BS (S620).

The UE determines its Rx beam (S630).

The UE skips CSI reporting (S640). In this case, reportQuantity may be set to 'No report (or None)' in CSI report config.

That is, when repetition is set to 'ON', the UE may skip CSI reporting.

Figure 7:
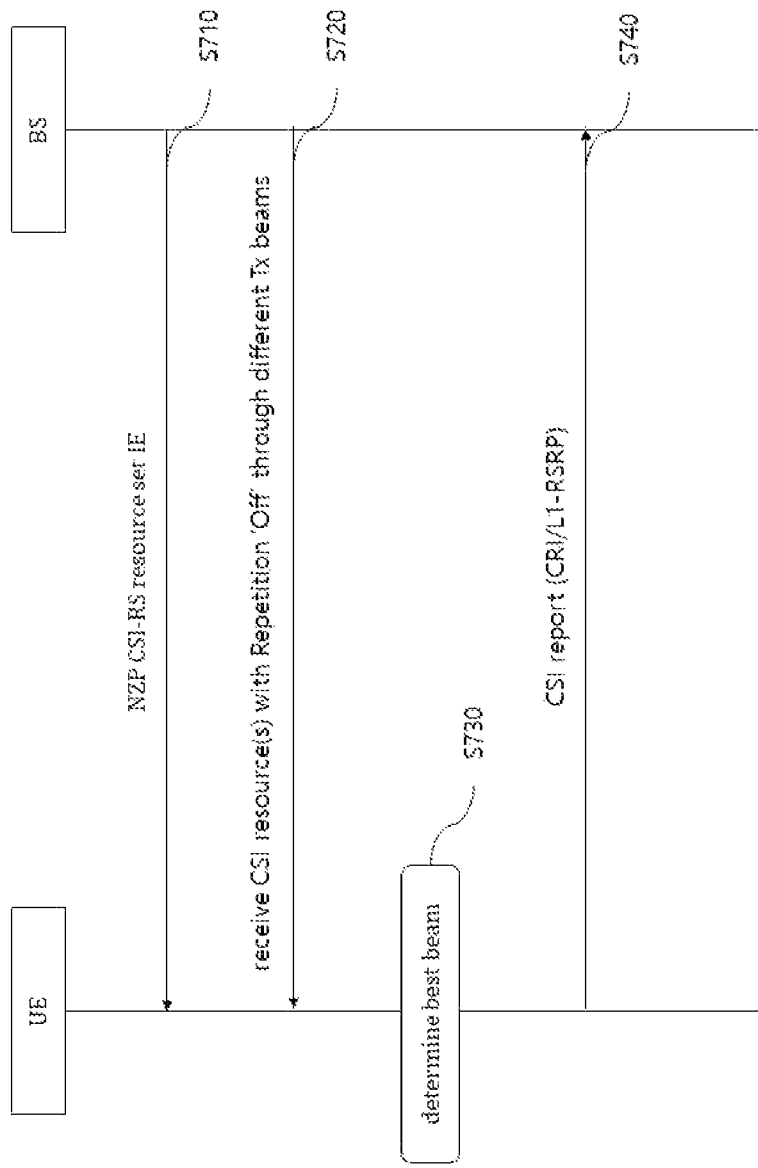
FIG. 7 is a diagram illustrating a signal flow for an exemplary process of determining a transmission beam at a base station (BS).

With reference to FIG. 6(b) and FIG. 7 to be described later, a Tx beam determination procedure of a BS will be described.

FIG. 7 is a diagram illustrating a signal flow for an exemplary Tx beam determination procedure of a BS.

Referring to FIG. 7, a UE receives an NZP CSI-RS resource set IE including a higher layer parameter, repetition from the BS by RRC signaling (S710). Repetition is set to 'OFF' and related to a Tx beam sweeping procedure of the BS.

The UE receives resources of the CSI-RS resource set with repetition set to 'OFF' through different Tx beams (DL spatial domain transmission filters) of the BS (S720).

The UE selects (or determines) the best beam (S740).

The UE reports the ID and related quality information (e.g., L1-RSRP) of the selected beam to the BS (S740). In this case, reportQuantity may be set to 'CRI+L1-RSRP' in CSI report config.

That is, when a CSI-RS is transmitted for BM, the UE reports a CRI and an L1-RSRP of the CSI to the BS.

Figure 8:
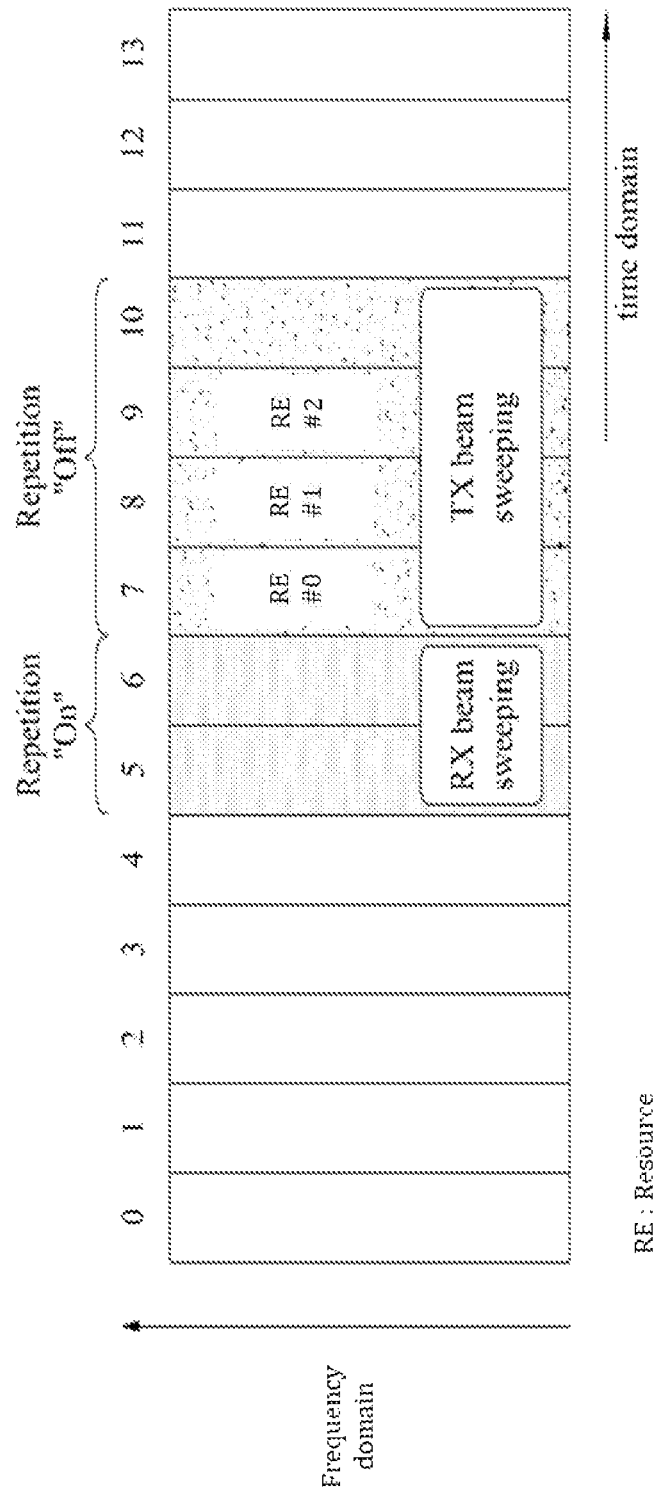
FIG. 8 is a diagram illustrating an exemplary resource allocation in the time and frequency domains in relation to the operation of FIG. 5.

FIG. 8 is a diagram illustrating an exemplary resource allocation in the time and frequency domains in relation to the operation of FIG. 5.

As illustrated in FIG. 8, when repetition is set to 'ON' in the CSI-RS resource set, a plurality of CSI-RS resources are used repeatedly through the same Tx beam, whereas when repetition is set to 'OFF' in the CSI-RS resource set, different CSI-RS resources are transmitted through different Tx beams.

A DL BM-related beam indication will be described below.

The UE may be configured with a list of up to M candidate transmission configuration indication (TCI) states at least for the purpose of quasi co-location (QCL) indication by RRC signaling. M may be 64.

Each TCI state may be configured with one RS set. For the ID of each DL RS used at least for the purpose of spatial QCL (QCL Type D) in an RS set, one of DL RS types such as SSB, P-CSI RS, SP-CSI RS, and A-CSI RS may be referred to.

The ID(s) of the DL RS(s) in the RS set used at least for the purpose of spatial QCL may be initialized/updated by explicit signaling.

Table 5 below illustrates an exemplary TCI-State IE.

TABLE 5

-- ASN1START
-- TAG-TCI-STATE-START
TCI-State ::=            SEQUENCE {
    tci-StateId              TCI-StateId,

TABLE 5-continued

```
qcl-Type1                    QCL-Info,
qcl-Type2                    QCL-Info
    OPTIONAL,  -- Need R
 ...
}
QCL-Info ::=                 SEQUENCE {
cell                         ServCellIndex
    OPTIONAL,  -- NeedR
bwp-Id                       BWP-Id
    OPTIONAL, -- Cond CSI-RS-Indicated
referenceSignal              CHOICE {
    csi-rs                   NZP-CSI-RS-
ResourceId,
    ssb                      SSB-
Index
},
qcl-Type                     ENUMERATED
{typeA, typeB, typeC, typeD},
 ...
}
-- TAG-TCI-STATE-STOP
-- ASN1STOP
```

The TC-State IE associates one or two DL RSs with a corresponding QCL type.

In Table 5, a parameter bwp-Id identifies a DL BWP in which an RS is located, a parameter cell indicates a carrier in which the RS is located, and a parameter reference signal indicates reference antenna port(s) serving as a QCL source for target antenna port(s) or an RS including the reference antenna port(s). The target antenna port(s) may be for a CSI-RS, PDCCH DMRS, or PDSCH DMRS. For example, to indicate QCL reference RS information for an NZP CSI-RS, a corresponding TCI state ID may be indicated by NZP CSI-RS resource configuration information. In another example, to indicate QCL reference information for PDCCH DMRS antenna port(s), a TCI state ID may be indicated in each CORESET configuration. In another example, a TCI state ID may be indicated by DCI to indicate QCL reference information for PDSCH DMRS antenna port(s).

A description will be given of QCL.

An antenna port is defined such that a channel carrying a symbol through an antenna port may be inferred from a channel carrying another symbol through the same antenna port. When the properties of a channel carrying a symbol through one antenna port may be inferred from a channel carrying a symbol through another antenna port, it may be said that the two antenna ports are in a quasi co-located or quasi co-location (QC/QCL) relationship.

The channel properties may include one or more of delay spread, Doppler spread, frequency/Doppler shift, average received power, reception timing/average delay, and a spatial Rx parameter. The spatial Rx parameter means a spatial (reception) channel property parameter such as an angle of arrival.

The UE may be configured with a list of up to M TCI-State configurations to decode a PDSCH according to a detected PDCCH carrying DCI intended for the UE and a given serving cell. M depends on a UE capability.

Each TCI-State includes a parameter for establishing a QCL relationship between one or two DL RSs and a PDSCH DMRS port.

The QCL relationship is configured by an RRC parameter qcl-Type1 for a first DL RS and a higher layer parameter qcl-Type2 for a second DL RS (if configured). The two DL RSs are not of the same QCL type irrespective of whether their references are the same or different DL RSs.

The QCL type of each DL RS is given by a higher layer parameter qcl-Type included in QCL-Info, and may have one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is for a specific NZP CSI-RS, corresponding NZP CSI-RS antenna ports may be indicated/configured as QCLed with a specific TRS from the perspective of QCL-Type A and with a specific SSB from the perspective of QCL-Type D. Upon receipt of this indication/configuration, the UE may receive the NZP CSI-RS using a Doppler value and a delay value which are measured in a QCL-TypeA TRS, and apply an Rx beam used to receive a QCL-TypeD SSB for reception of the NZP CSI-RS.

The UE may receive an activation command by MAC CE signaling used to map up to 8 TCI states to a codepoint of a DCI field 'Transmission Configuration Indication'.

For a description of QCL in the standard, refer to 3GPP TS 38.214. section 5.1.5.

Now, UL BM will be described in detail.

In UL BM, reciprocity (or beam correspondence) between a Tx beam and an Rx beam may or may not be established depending on UE implementation. When the Tx beam-Rx beam reciprocity is established in both a BS and a UE, a UL beam pair may be obtained based on a DL beam pair. However, when the Tx beam-Rx beam reciprocity is not established in at least one of the BS or the UE, a process of determining a UL beam pair is needed separately from DL beam pair determination.

Even when both the BS and the UE maintain beam correspondence, the BS may use the UL BM procedure for determining a DL Tx beam, even though the UE does not request a report of a (preferred) beam.

UM BM may be performed by beamformed UL SRS transmission, and whether to apply UL BM to an SRS resource set is configured by (a higher layer parameter) usage. When usage is set to 'BeamManagement (BM)', only one SRS resource in each of a plurality of SRS resource sets may be transmitted in a given time instant.

The UE may be configured with one or more SRS resource sets configured by (a higher layer parameter) SRS-ResourceSet (by higher layer signaling or RRC signaling). For each SRS resource set, the UE may be configured with K≥1 SRS resources (a higher layer parameter, SRS-resource), where K is a natural number, and a maximum value of K is indicated by SRS_capability.

Like DL BM, the UL BM procedure may be divided into Tx beam sweeping of a UE and Rx beam sweeping of a BS.

Figure 9:
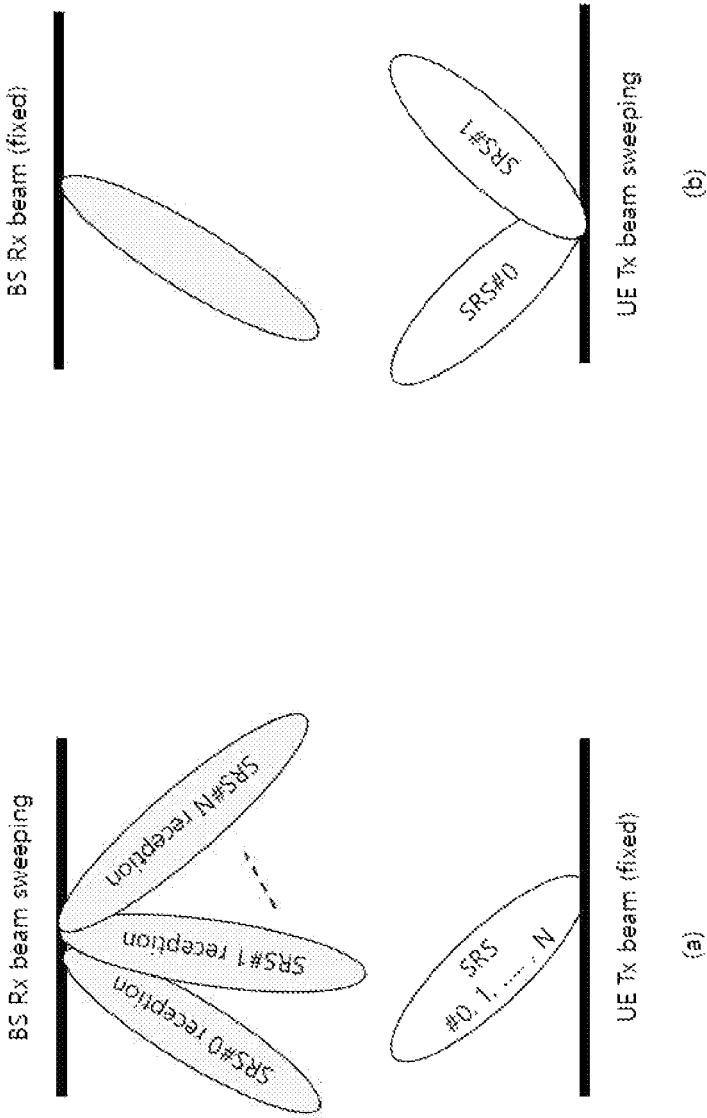
FIG. 9 is a diagram illustrating an exemplary uplink (UL) BM procedure using a sounding reference signal (SRS).

FIG. 9 illustrates an exemplary UL BM procedure using an SRS.

FIG. 9(a) illustrates an Rx beam determination procedure of a BS, and FIG. 9(b) illustrates a Tx beam sweeping procedure of a UE.

Referring to FIG. 9(a), the BS may perform beam sweeping to receive an SRS by forming a plurality of Rx beams in different directions. In the BS Rx beam sweeping, a UE Tx beam is fixed in any one direction.

Referring to FIG. 9(b), the UE may transmit an SRS by forming a plurality of Tx beams in different directions. In the UE Tx beam sweeping, a BS Rx beam is fixed in any one direction.

Figure 10:
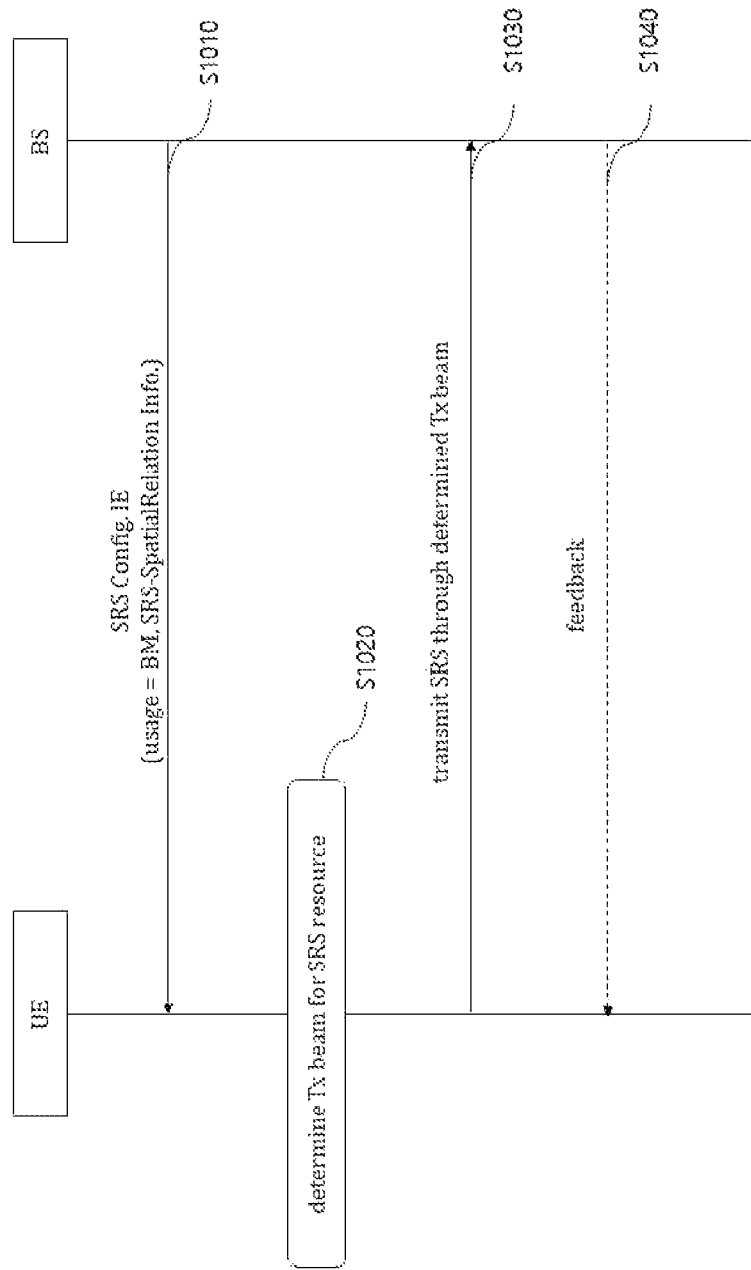
FIG. 10 is a diagram illustrating a signal flow for an exemplary UL BM procedure using an SRS.

FIG. 10 is a diagram illustrating a signal flow for an exemplary UL BM procedure using an SRS.

Referring to FIG. 10, a UE receives, from a BS, RRC signaling (e.g., SRS-Config IE) including (a higher layer parameter) usage set to 'beam management' (S1010).

Table 6 illustrates an exemplary SRS-Config IE.

TABLE 6

```
-- ASN1START
-- TAG-MAC-CELL-GROUP-CONFIG-START
SRS-Config ::=                              SEQUENCE {
srs-ResourceSetToReleaseList                SEQUENCE
(SIZE(1..maxNrofSRS-ResourceSets)) OF SRS-ResourceSetId
OPTIONAL,  -- Need N
srs-ResourceSetToAddModList                 SEQUENCE
(SIZE(1..maxNrofSRS-ResourceSets)) OF SRS-ResourceSet
OPTIONAL,  -- Need N
srs-ResourceToReleaseList                   SEQUENCE
(SIZE(1..maxNrofSRS-Resources)) OF SRS-ResourceId
OPTIONAL,  -- Need N
srs-ResourceToAddModList                    SEQUENCE
(SIZE(1..maxNrofSRS-Resources)) OF SRS-Resource
OPTIONAL,  -- Need N
tpc-Accumulation                            ENUMERATED
{disabled}
        OPTIONAL,  -- Need S
...
}
SRS-ResourceSet ::=                         SEQUENCE {
srs-ResourceSetId                           SRS-ResourceSetId,
srs-ResourceIdList                          SEQUENCE
(SIZE(1..maxNrofSRS-ResourcesPerSet)) OF SRS-ResourceId
OPTIONAL,  -- Cond Setup
resourceType                                CHOICE {
    aperiodic
SEQUENCE {
    aperiodicSRS-ResourceTrigger            INTEGER
(1..maxNrofSRS-TriggerStates-1),
    csi-RS
NZP-CSI-RS-ResourceId
        OPTIONAL,  -- Cond NonCodebook
    slotOffset
INTEGER (1..32)
        OPTIONAL,  -- Need S
    ...
},
semi-persistent
SEQUENCE {
    associatedCSI-RS                        NZP-
CSI-RS-ResourceId
        OPTIONAL, -- Cond NonCodebook
    ...
},
periodic
SEQUENCE {
    associatedCSI-RS                        NZP-
CSI-RS-ResourceId
        OPTIONAL, -- Cond NonCodebook
    ...
}
},
usage
ENUMERATED {beamManagement, codebook, nonCodebook,
antennaSwitching},
alpha                                       Alpha
        OPTIONAL, -- Need S
p0
INTEGER (-202..24)
                                OPTIONAL, -- Cond Setup
pathlossReferenceRS                         CHOICE {
    ssb-Index                               SSB-
Index,
    csi-RS-Index                            NZP-CSI-RS-
ResourceId
SRS-SpatialRelationInfo ::=                 SEQUENCE {
servingCellId                               ServCellIndex
                                OPTIONAL,  -- Need S
referenceSignal                             CHOICE {
    ssb-Index                               SSB-Index,
    csi-RS-Index                            NZP-CSI-RS-
ResourceId,
    srs
```

TABLE 6-continued

```
SEQUENCE {
    resourceId                              SRS-
ResourceId,
    uplinkBWP                               BWP-Id
    }
  }
 }
}
SRS-ResourceId ::=                          INTEGER
(0..maxNrofSRS-Resources-1)
```

The SRS-Config IE is used for an SRS transmission configuration. The SRS-Config IE includes an SRS-Resources list and a SRS-ResourceSet list. Each SRS resource set refers to a set of SRS-resources.

A network may trigger an SRS resource set transmission by using configured aperiodicSRS-ResourceTrigger (L1 DCI).

In Table 6, usage is a higher layer parameter indicating whether the SRS resource set is used for BM or codebook-based or non-codebook-based transmission. The parameter usage corresponds to an L1 parameter, 'SRS-SetUse'. 'spatialRelationInfo' is a parameter indicating a configuration for the spatial relation between a reference RS and a target SRS. The reference RS may be an SSB, a CSI-RS, or an SRS corresponding to the L1 parameter, 'SRS-SpatialRelationInfo'. Usage is configured for each SRS resource set.

The UE determines Tx beamforming for an SRS resource to be transmitted based on SRS-SpatialRelation Info included in the SRS-Config IE (S1020). SRS-SpatialRelation Info is configured for each SRS resource and indicates whether to apply the same beam as used for an SSB, a CSI-RS, or an SRS on an SRS resource basis. Further, SRS-SpatialRelationInfo may or may not be configured for each SRS resource.

If SRS-SpatialRelationInfo is configured for an SRS resource, the same beam as used for the SSB, the CSI-RS, or the SRS is applied for transmission of the SRS resource. However, if SRS-SpatialRelationInfo is not configured for the SRS resource, the UE randomly determines a Tx beam and transmits an SRS by the determined Tx beam (S1030).

More specifically, for a P-SRS with 'SRS-ResourceConfigType' set to 'periodic':
  i) if SRS-SpatialRelationInfo is set to 'SSB/PBCH,' the UE transmits the SRS resource by applying the same spatial domain transmission filter as the spatial domain Rx filter used for reception of an SSB/PBCH (or generated from the corresponding filter); or
  ii) if SRS-SpatialRelationInfo is set to 'CSI-RS,' the UE transmits the SRS resource by applying the same spatial domain transmission filter as used for reception of a periodic CSI-RS or an SP CSI-RS; or
  iii) if SRS-SpatialRelationInfo is set to 'SRS,' the UE transmits the SRS resource by applying the same spatial domain transmission filter as used for transmission of a periodic SRS.

When SRS-SpatialRelationInfo is set to 'SP-SRS' or 'AP-SRS', a beam determination and transmission operation may be applied in a similar manner to the above description.

Additionally, the UE may or may not receive a feedback for the SRS from the BS, as in the following three cases (S1040).
  i) When Spatial_Relation_Info is configured for all SRS resources within the SRS resource set, the UE transmits the SRS through a beam indicated by the BS. For example, when all of Spatial_Relation_Info indicates the same SSB, CRI, or SRI, the UE repeatedly transmits the SRS through the same beam. In this case, the BS uses the SRS for the purpose of selecting an Rx beam.

ii) Spatial_Relation_Info may be configured for none of the SRS resources within the SRS resource set. In this case, the UE may perform transmission while freely changing an SRS beam. That is, in this case, the UE uses the SRS for the purpose of Tx beam sweeping.

iii) Spatial_Relation_Info may be configured for only some SRS resources within the SRS resource set. In this case, the UE may transmit the SRS in the configured SRS resources through an indicated beam, and transmit the SRS in an SRS resources for which Spatial_Relation_Info is not configured, by randomly applying a Tx beam.

Figure 11:
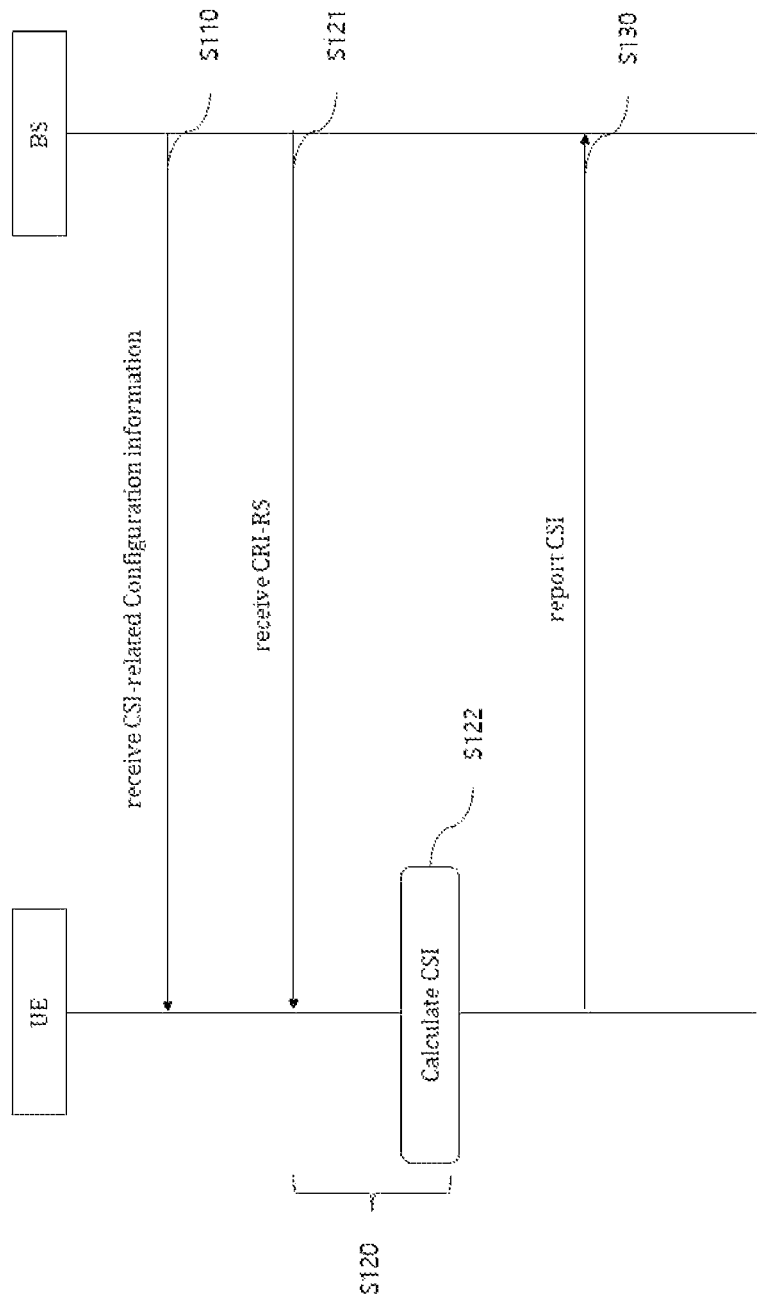
FIG. 11 is a diagram illustrating a signal flow for an exemplary CSI-related procedure.

FIG. 11 is a diagram illustrating a signal flow for a CSI-related procedure.

In the NR system, a CSI-RS is used for time and/or frequency tracking, CSI computation, L1-RSRP computation, and mobility. The CSI computation is related to CSI acquisition, and the L1-RSRP computation is related to BM.

CSI collectively refers to information that may indicate the quality of a radio channel (or link) formed between a UE and an antenna port.

Referring to FIG. 11, to serve one of the above-described usages of the CSI-RS, a terminal (e.g., UE) receives CSI-related configuration information from a BS (e.g., general Node B (gNB)) by RRC signaling (S110).

The CSI-related configuration information may include at least one of channel state information-interference measurement (CSI-IM)-related information, CSI measurement-related information, CSI resource configuration-related information, CSI-RS resource-related information, or CSI report configuration-related information.

The CSI-IM resource-related information may include CSI-IM resource information and CSI-IM resource set information. A CSI-IM resource set is identified by a CSI-IM resource set ID, and one resource set includes at least one CSI-IM resource. Each CSI-IM resource is identified by a CSI-IM resource ID.

The CSI resource configuration-related information may be described in a CSI-ResourceConfig IE. The CSI resource configuration-related information defines a group including at least one of an NZP CSI-RS resource set, a CSI-IM resource set, or a CSI-SSB resource set. That is, the CSI resource configuration-related information includes a CSI-RS resource set list, and the CSI-RS resource set list may include at least one of an NZP CSI-RS resource set list, a CSI-IM resource set list, or a CSI-SSB resource set list. A CSI-RS resource set is identified by a CSI-RS resource set ID, and one resource set includes at least one CSI-RS resource. Each CSI-RS resource is identified by a CSI-RS resource ID.

Table 7 below illustrates an exemplary NZP CSI-RS resource set IE.

TABLE 7

```
-- ASN1START
-- TAG-NZP-CSI-RS-RESOURCESET-START
NZP-CSI-RS-ResourceSet ::=      SEQUENCE {
nzp-CSI-ResourceSetId           NZP-CSI-RS-ResourceSetId,
nzp-CSI-RS-Resources            SEQUENCE (SIZE
(1..maxNrofNZP-CSI-RS-ResourcesPerSet)) OF
NZP-CSI-RS-ResourceId,
repetition                      ENUMERATED { on,
off }
    OPTIONAL,
```

TABLE 7-continued

```
aperiodicTriggeringOffset       INTEGER(0..4)
    OPTIONAL,  -- Need S
trs-Info                        ENUMERATED {true}
    OPTIONAL,  -- NeedR
...
}
-- TAG-NZP-CSI-RS-RESOURCESET-STOP
-- ASN1STOP
```

As described in Table 7, parameters indicating the usage of the CSI-RS (e.g., a BM-related parameter 'repetition' and a tracking-related parameter 'trs-Info') may be configured for each NZP CSI-RS resource set.

A higher layer parameter, repetition corresponds to an L1 parameter, 'CSI-RS-ResourceRep'.

The CSI report configuration-related information includes a parameter reportConfigType indicating a time domain behavior, and a parameter reportQuantity indicating a CSI-related quantity for reporting. The time domain behavior may be periodic, aperiodic or semi-persistent.

The CSI report configuration-related information may be described in a CSI-ReportConfig IE, and Table 8 below illustrates an exemplary CSI-ReportConfig IE.

TABLE 8

```
-- ASN1START
-- TAG-CSI-RESOURCECONFIG-START
CSI-ReportConfig ::=                    SEQUENCE {
reportConfigId                          CSI-ReportConfigId,
carrier                                 ServCellIndex
        OPTIONAL,  -- Need S
resourcesForChannelMeasurement          CSI-ResourceConfigId,
csi-IM-ResourcesForInterference         CSI-ResourceConfigId
    OPTIONAL,  -- NeedR
nzp-CSI-RS-ResourcesForInterference     CSI-ResourceConfigId
    OPTIONAL,  -- Need R
reportConfigType                        CHOICE {
    periodic
SEQUENCE {
        reportSlotConfig                CSI-
ReportPeriodicityAndOffset,
        pucch-CSI-ResourceList
SEQUENCE (SIZE (1..maxNrofBWPs)) OF PUCCH-CSI-Resource
    },
    semiPersistentOnPUCCH               SEQUENCE {
        reportSlotConfig                CSI-
ReportPeriodicityAndOffset,
        pucch-CSI-ResourceList
SEQUENCE (SIZE (1..maxNrofBWPs)) OF PUCCH-CSI-Resource
    },
    semiPersistentOnPUSCH               SEQUENCE {
        reportSlotConfig
ENUMERATED {sl5, sl10, sl20, sl40, sl80, sl160, sl320},
        reportSlotOffsetList            SEQUENCE (SIZE (1..
maxNrofUL-Allocations)) OF INTEGER(0..32),
        p0alpha
P0-PUSCH-AlphaSetId
    },
    aperiodic
SEQUENCE {
        reportSlotOffsetList            SEQUENCE (SIZE
(1..maxNrofUL-Allocations)) OF INTEGER(0..32)
    }
},
reportQuantity                          CHOICE {
    none                                NULL,
    cri-RI-PMI-CQI                      NULL,
    cri-RI-i1                           NULL,
    cri-RI-i1-CQI                       SEQUENCE {
        pdsch-BundleSizeForCSI
ENUMERATED {n2, n4}     OPTIONAL
    },
    cri-RI-CQI                          NULL,
    cri-RSRP                            NULL,
```

TABLE 8-continued

| | |
|---|---|
| ssb-Index-RSRP | NULL, |
| cri-RI-LI-PMI-CQI | NULL |
| }, | |

The UE measures CSI based on the CSI-related configuration information (S120).

The CSI measurement may include (1) CSI-RS reception of the UE (S121) and (2) CSI calculation based on the received CSI-RS at the UE (S122), which will be described later in detail.

Time and frequency-domain mapping of the CSI-RS to resource elements (REs) in a CSI-RS resource is configured by a higher layer parameter, CSI-RS-ResourceMapping.

Table 9 below illustrates an exemplary CSI-RS-ResourceMapping IE.

TABLE 9

| | |
|---|---|
| -- ASN1START | |
| -- TAG-CSI-RS-RESOURCEMAPPING-START | |
| CSI-RS-ResourceMapping ::= | SEQUENCE { |
| frequencyDomainAllocation | CHOICE { |
| row1 | BIT STRING |
| (SIZE (4)), | |
| row2 | BIT STRING |
| (SIZE (12)), | |
| row4 | BIT STRING |
| (SIZE (3)), | |
| other | BIT STRING |
| (SIZE (6)) | |
| }, | |
| nrofPorts | ENUMERATED |
| {p1,p2,p4,p8,p12,p16,p24,p32}, | |
| firstOFDMSymbolInTimeDomain | INTEGER (0..13), |
| firstOFDMSymbolInTimeDomain2 | INTEGER (2..12) |
| OPTIONAL, -- Need R | |
| cdm-Type | ENUMERATED |
| {noCDM, fd-CDM2, cdm4-FD2-TD2, cdm8-FD2-TD4}, | |
| density | CHOICE { |
| dot5 | |
| ENUMERATED {evenPRBs, oddPRBs}, | |
| one | NULL, |
| three | NULL, |
| spare | NULL |
| }, | |
| freqBand | CSI- |
| FrequencyOccupation, | |
| ... | |
| } | |

In Table 9, density (D) represents the density of CSI-RS resources measured in an RE/port/physical resource block (PRB), and nrofPorts represents the number of antenna ports.

The UE reports the measured CSI to the BS (S130).

When quantity is set to 'none (or No report)' in CSI-ReportConfig in Table 8, the UE may omit the report.

However, even when quantity is set to 'none (or No report)', the UE may transmit a report to the BS.

Quantity is set to 'none', when an aperiodic TRS is triggered or repetition is set.

Only when repetition is set to 'ON', the UE may omit the report.

A CSI measurement procedure will be described below in detail.

The NR system supports more flexible, more dynamic CSI measurement and reporting. The CSI measurement may include a procedure of receiving a CSI-RS and acquiring CSI by computation of the received CSI-RS.

As a time domain behavior of CSI measurement and reporting, aperiodic/semi-persistent/periodic channel measurement (CM) and interference measurement (IM) are supported. To configure CSI-IM, a 4-port NZP CSI-RS RE pattern is used.

In NR, a CSI-IM-based interference measurement resource (IMR) is designed similarly to an LTE CSI-IM and configured independently of a ZP CSI-RS resource for PDSCH rate matching. Each port in an NZP CSI-RS-based IMR emulates an interference layer having (a preferred channel and) a precoded NZP CSI-RS. This is for intra-cell interference measurement in a multi-user case, targeting mainly at multi-user (MU) interference.

The BS transmits a precoded NZP CSI-RS through each port of the configured NZP CSI-RS-based IMR to the UE.

The UE measures interference, assuming a channel/interference layer for each port in a resource set.

In the absence of any PMI and RI feedback for a channel, multiple resources are configured in the set, and the BS or the network indicates a subset of NZP CSI-RS resources for channel/interference measurement by DCI.

Resource setting and a resource setting configuration will be described below in greater detail.

Resource Setting

Each CSI resource setting 'CSI-ResourceConfig' includes a configuration of S≥1 CSI resource sets (given by a higher layer parameter csi-RS-ResourceSetList). The CSI resource setting corresponds to CSI-RS-resourcesetlist. S represents the number of configured CSI-RS resource sets. The configuration of S≥1 CSI resource sets includes each CSI resource set including (NZP CSI-RS or CSI-IM) CSI-RS resources, and SSB resources used for L1-RSRP computation.

Each CSI resource setting is located in a DL bandwidth part (BWP) identified by a higher layer parameter bwp-id. All CSI resource settings linked to a CSI reporting setting have the same DL BWP.

The time domain behavior of a CSI-RS resource within a CSI resource setting within the CSI-ResourceConfig IE is indicated by a higher layer parameter, resourceType, and may be set to aperiodic, periodic, or semi-persistent. For periodic and semi-persistent CSI resource settings, the number S of configured CSI-RS resource sets is limited to '1'. For the periodic and semi-persistent CSI resource settings, a configured periodicity and slot offset are given by the numerology of an associated DL BWP as given by a bwp-id.

When the UE is configured with multiple CSI-ResourceConfigs including the same NZP CSI-RS resource ID, the same time domain behavior is configured for the CSIResourceConfigs.

When the UE is configured with multiple CSI-ResourceConfigs including the same CSI-IM resource ID, the same time domain behavior is configured for the CSI-ResourceConfigs.

One or more CSI resource settings for channel measurement and interference measurement configure the following resources by higher layer signaling.

CSI-IM resource for interference measurement.

NZP CSI-RS resource for interference measurement.

NZP CSI-RS resource for channel measurement

That is, a channel measurement resource (CMR) may be an NZP CSI-RS for CSI acquisition, and an IMR may be an NZP CSI-RS for CSI-IM and IM.

The CSI-IM (or ZP CSI-RS for IM) is mainly used for inter-cell measurement.

The NZP CSI-RS for IM is used mainly for measurement of intra-cell interference from multiple users.

The UE may assume that CSI-RS resource(s) for channel measurement and CSI-IM/NZP CSI-RS resource(s) for interference measurement configured for one CSI report are resource-wise QCLed in 'QCL-TypeD'.

Resource Setting Configuration

As described above, a resource setting may mean a resource set list.

For aperiodic CSI, each trigger state configured by a higher layer parameter, CSI-AperiodicTriggerState is associated with one or more CSI-ReportConfigs, each being linked to a periodic semi-persistent, or aperiodic resource setting.

One reporting setting may be linked to up to three resource settings.

When one resource setting is configured, the resource setting (given by a higher layer parameter resourcesForChannelMeasurement) is for channel measurement for L1-RSRP computation.

When two resource settings are configured, a first resource setting (given by the higher layer parameter resourcesForChannelMeasurement) is for channel measurement, and a second resource setting (given by csi-IM-ResourcesForInterference or nzp-CSI-RS-ResourcesForInterference) is for interference measurement in the CSI-IM or on the NZP CSI-RS.

When three resource settings are configured, a first resource setting (given by resourcesForChannelMeasurement) is for channel measurement, a second resource setting (given by csi-IM-ResourcesForInterference) is for CSI-IM-based interference measurement, and a third resource setting (given by nzp-CSI-RS-ResourcesForInterference) is for NZP CSI-RS-based interference measurement.

For semi-persistent or periodic CSI, each ReportConfig is linked to a periodic or semi-persistent resource setting.

When one resource setting (given by resourcesForChannelMeasurement) is configured, the resource setting is for channel measurement for L1-RSRP computation.

When two resource settings are configured, a first resource setting (given by resourcesForChannelMeasurement) is for channel measurement, and a second resource setting (given by a higher layer parameter csi-IM-ResourcesForInterference) is used for interference measurement performed in the CSI-IM.

Figure 12:
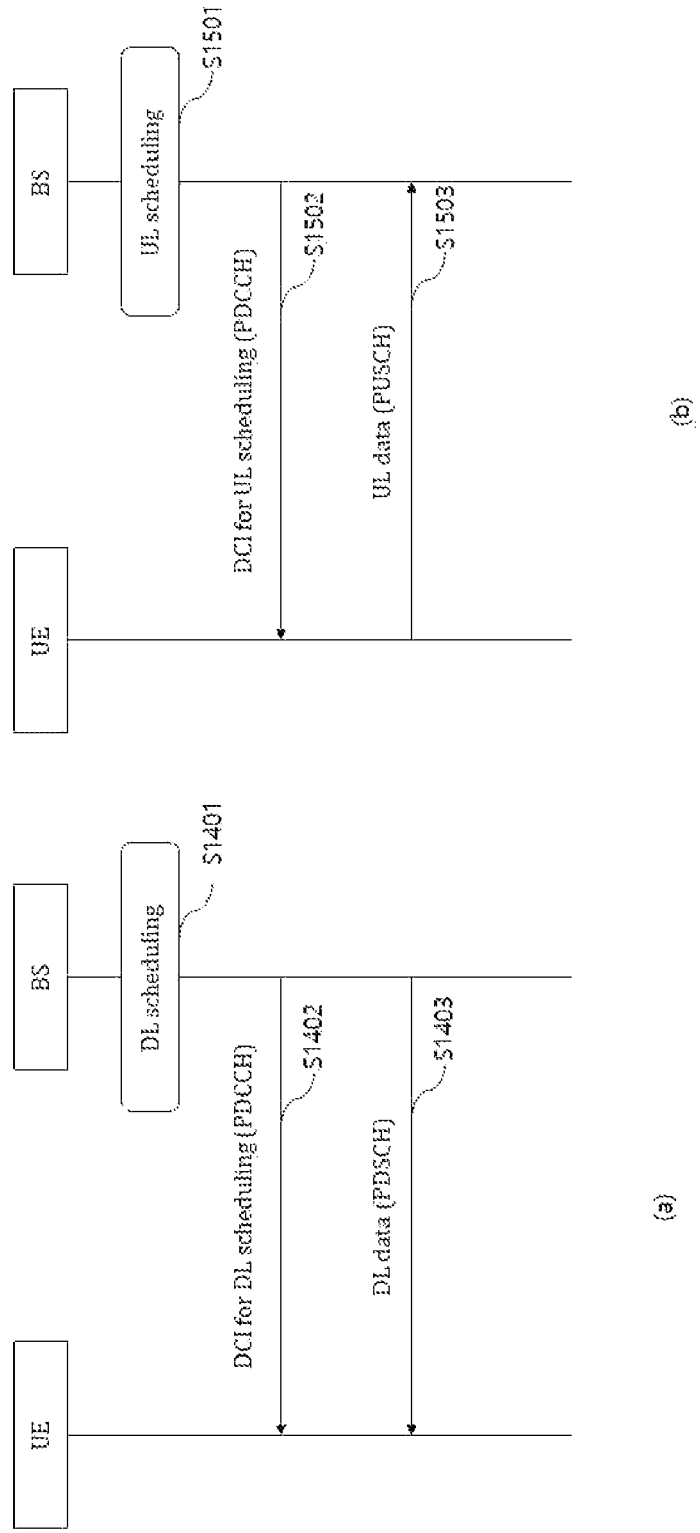
FIG. 12 is a diagram illustrating a signal flow for a DL/UL transmission/reception operation.

FIG. 12 is a diagram illustrating a signal flow for a DL/UL transmission/reception operation.

FIG. 12(a) is a diagram illustrating a signal flow for a DL transmission/reception operation.

Referring to FIG. 12(a), a BS schedules a DL transmission such as frequency/time resources, a transport layer, a DL precoder, an MCS, and so on (S1401). Particularly, the BS may determine a beam to be used for a PDSCH transmission to a UE by the afore-described operations.

The UE receives downlink control information (DCI) for DL scheduling from the BS (i.e., including scheduling information for a PDSCH) on a PDCCH (S1402).

DCI format 1_0 or 1_1 may be used for DL scheduling. Particularly, DCI format 1_1 includes the following information: a DCI format ID, a BWP indicator, a frequency domain resource assignment, a time domain resource assignment, a PRB bundling size indicator, a rate matching indicator, a ZP CSI-RS trigger, antenna port(s), a TCI, an SRS request, and DMRS sequence initialization.

Particularly, according to each state indicated by an antenna port(s) field, the number of DMRS ports may be scheduled, and single-user (SU)/multi-user (MU) transmission scheduling is possible.

A TCI field includes 3 bits, and up to 8 TCI states are indicated according to values of the TCI field. Therefore, QCL for the DMRS is dynamically indicated.

The UE receives DL data on the PDSCH from the BS (S1403).

Upon detection of a PDCCH including DCI format 1_0 or 1_1, the UE decodes the PDSCH according to an indication of the DCI. When the UE receives a PDSCH scheduled by DCI format 1, the UE may be configured with a DMRS configuration type by a higher layer parameter 'dmrs-Type', and the DMRS type is used to receive the PDSCH.

Further, the UE may be configured with a maximum number of front-loaded DMRA symbols for the PDSCH by a higher layer parameter 'maxLength'.

In the case of DMRS configuration type 1, when a single codeword is scheduled for the UE, and an antenna port mapped to an index of {2, 9, 10, 11 or 30} is specified, or when two codewords are scheduled for the UE, the UE assumes that none of the remaining orthogonal antenna ports are associated with a PDSCH transmission to another UE.

Alternatively, in the case of DMRS configuration type 2, when a single codeword is scheduled for the UE, and an antenna port mapped to an index of {2, 10 or 23} is specified, or when two codewords are scheduled for the UE, the UE assumes that none of the remaining orthogonal antenna ports are associated with a PDSCH transmission to another UE.

When receiving the PDSCH, the UE may assume that a precoding granularity P' is consecutive RBs in the frequency domain. P' may correspond to one of {2, 4, wideband}.

When P' is determined to be wideband, the UE may assume that the same precoding is applied to allocated resources, without expecting that non-contiguous PRBs are scheduled.

On the other hand, when P' is determined to be any one of {2, 4}, a precoding resource block group (PRG) is divided into P' consecutive PRBs. The actual number of consecutive PRBs in each PRG may be 1 or larger. The UE may assume that the same precoding is applied to consecutive DL PRBs in the PRG.

To determine a modulation order, a target code rate, and a transport block size of the PDSCH, the UE reads a 5-bit MCD field in the DCI, and determines the modulation order and the target code rate. Then, the UE reads a redundancy version (RV) field in the DCI and determines an RV. The UE determines the transport block size by using the number of layers and the total number of allocated PRBs before rate matching.

FIG. 12(b) is a diagram illustrating a signal flow for a UL transmission/reception operation.

Referring to FIG. 12(b), a BS schedules a UL transmission such as frequency/time resources, a transport layer, a UL precoder, an MCS, and so on (S1501).

Particularly, the BS may determine a beam by which the UE is to transmit a PUSCH through the above-described operations.

The UE receives DCI for UL scheduling (i.e., including scheduling information for a PUSCH) on a PDCCH from the BS (S1502).

DCI format 0_0 or 01 may be used for UL scheduling, and particularly, DCI format 0_1 includes the following information: a DCI format ID, a UL/supplementary uplink (SUL) indicator, a BWP indicator, a frequency domain resource assignment, a time domain resource assignment, a frequency hopping flag, an MCS, an SRS resource indicator (SRI), precoding information and the number of layers, antenna port(s), an SRS request, DMRS sequence initialization, and a uplink shared channel (UL-SCH) indicator.

Particularly, SRS resources configured in an SRS resource set associated with the higher layer parameter 'usage' may be indicated by an SRS resource indicator field. In addition, 'spatialRelationInfo' may be configured for each SRS resource, and its value may be one of {CRI, SSB, SRI}.

The UE transmits UL data to the BS on the PUSCH (S1503).

Upon detection of a PDCCH including DCI format 00 or 0_1, the UE transmits the PUSCH according to an indication of the DCI.

For PUSCH transmission, two transmission schemes are supported: codebook-based transmission and non-codebook-based transmission:

i) When a higher layer parameter 'txConfig' is set to 'codebook', the UE is configured with a codebook-based transmission. On the other hand, when the higher layer parameter 'txConfig' is set to 'nonCodebook', the UE is configured with a non-codebook-based transmission. When the higher layer parameter 'txConfig' is not configured, the UE does not expect to be scheduled by DCI format 0_1. When a PUSCH is scheduled by DCI format 0_0, the PUSCH transmission is based on a single antenna port.

In the case of a codebook-based transmission, a PUSCH may be scheduled by DCI format 0_0, DCI format 0_1, or semi-statically. When the PUSCH is scheduled by DCI format 0_1, the UE determines a PUSCH transmission precoder based on an SRI, a transmit precoding matrix indicator (TPMI), and a transmission rank from the DCI, as given by the SRS resource indicator field, and a precoding information and number of layers field. The TPMI is used to indicate a precoder to be applied across antenna ports, and corresponds to an SRS resource selected by the SRI, when multiple SRS resources are configured. Alternatively, when a single SRS resource is configured, the TPMI is used to indicate a precoder to be applied across antenna ports, and corresponds to a single SRS resource. A transmission precoder is selected from a UL codebook having the same number of antenna ports as indicated by a higher layer parameter 'nrofSRS-Ports'. When the UE is configured with a higher layer parameter 'txConfig' set to 'codebook', at least one SRS resource is configured for the UE. An SRI indicated in slot n is associated with the latest transmission of an SRS resource identified by the SRI, where the SRS resource precedes a PDCCH carrying the SRI (i.e., slot n).

ii) In the case of a non-codebook-based transmission, a PUSCH may be scheduled by DCI format 00, DCI format 01, or semi-statically. When multiple SRS resources are configured, the UE may determine a PUSCH precoder and a transmission rank based on a wideband SRI. The SRI may be given by the SRS resource indicator in the DCI or a higher layer parameter 'srs-ResourceIndicator'. The UE uses one or more SRS resources for an SRS transmission, and the number of SRS resources may be set for simultaneous transmissions within the same RB based on a UE capability. Only one SRS port is configured for each SRS resource. Only one SRS resource may be configured by the higher layer parameter, 'usage' set to 'nonCodebook'. The maximum number of SRS resources configurable for the non-codebook-based UL transmission is 4. An SRI indicated in slot n is associated with the latest transmission of an SRS resource identified by the SRI, and the SRS transmission precedes a PDCCH carrying the SRI (i.e., slot n).

A multi-TRP-related operation according to an embodiment will be described below in detail.

Coordinated multi-point (CoMP) is a technique in which a plurality of BSs cooperatively transmit signals to a UE by exchanging feedback channel information (e.g., an RI/CQI/PMI/LI) received from the UE with each other (e.g., via an X2 interface) or using the feedback channel information to effectively control interference. CoMP schemes may be divided into joint transmission (JT), coordinated scheduling (CS), coordinated beamforming (CB), dynamic point selection (DPS), and dynamic point blacking (DPB) according to their use mechanisms.

M-TRP (Multiple TRP) Transmission

M-TRP transmission schemes in which M TRPs transmit data to one UE may be divided into eMBB M-TRP transmission for greatly increasing a transmission rate, and URLLC M-TRP transmission for increasing a reception success rate and reducing latency.

From the perspective of DCI transmission, M-TRP transmission schemes may be divided into i) a multiple DCI (M-DCI)-based M-TRP transmission scheme in which different TRPs transmit different DCIs, and ii) a single DCI (S-DCI)-based M-TRP transmission scheme in which one TRP transmits a DCI. In the case of S-DCI, for example, all scheduling information for data transmitted by M TRPs should be transmitted in one DCI. Therefore, the S-DCI scheme may be used in an ideal backhaul (BH) environment in which dynamic cooperation is possible between two TRPs.

For example, in relation to TDM-based URLLC, scheme 4 refers to a method in which one TRP transmits a transport block (TB) in one slot. Scheme 4 has the effect of increasing a data reception probability through the same TB received in several slots from several TRPs. In contrast, scheme 3 refers to a method in which one TRP transmits a TB in several consecutive OFDM symbols (i.e., a symbol group). In scheme 3, multiple TRPs may be configured to transmit the same TB in different symbol groups within one slot.

In addition, the UE may recognize PUSCHs (or PUCCHs) scheduled by DCIs received in different CORESETs (or CORESETs belonging to different CORESET groups) as PUSCHs (or PUCCHs) to be transmitted to different TRPs or PUSCHs (or PUCCHs) of different TRPs. Further, a method of UL transmission (e.g. PUSCHs/PUCCHs) to different TRPs may be equally applied to UL transmission (e.g. PUSCHs/PUCCHs) to different panels belonging to the same TRP.

Description of Multiple DCI-Based NCJT/Single DCI-Based NCJT

Non-coherent joint transmission (NCJT) is a scheme in which multiple transmission points (TPs) transmit data to one UE in the same time and frequency. The TPs transmit data in different layers by using different DMRS ports. The TPs transmit data scheduling information to the NCJT receiving UE by DCIs. A method of transmitting scheduling information about its transmission data in DCI by each TP participating in the NCJT transmission is called multi-DCI-based NCJT. Because each of N TPs participating in the NCJT transmission transmits DL grant DCI and a PDSCH to the UE, the UE receives N DCIs and N PDSCHs from the N TPs. In contrast, a method of transmitting its transmission data and transmission data of other TPs in one DCI by a single representative TP is called single DCI-based NCJT. In this case, although the N TPs transmit one PDSCH, each TP transmits only some of multiple layers forming the single PDSCH. For example, when 4-layer data is transmitted, TP 1 transmits two layers, and TP 2 transmits the remaining two layers to the UE.

Multiple TRPs (MTRPs) for NCJT transmission may perform DL data transmission to the UE in one of the following two methods.

First, the single DCI-based MTRP method will be described. MTRPs cooperatively transmit one common PDSCH, and the TRPs participating in the cooperative transmission transmit different layers (i.e., different DMRS ports) into which the PDSCH is spatially divided. Scheduling information for the PDSCH is indicated to the UE by one DCI, and the DCI indicates which DMRS port uses which QCL RS and QCL type information (this is different from conventional indication of a QCL RS and TYPE to be applied commonly to all DMRS ports indicated by DCI). That is, M TCI states are indicated by a TCI field in the DCI (M=2 in the case of 2-TRP cooperative transmission), and a QCL RS and type are identified by using different M TCI states for M DMRS port groups. Further, the DMRS port information may be indicated by a new DMRS table.

Secondly, the multiple DCI-based MTRP method will be described. MTRPs transmit different DCIs and PDSCHs, respectively, and the PDSCHs are transmitted, while being (fully or partially) overlapped with each other in frequency and time resources. The PDSCHs are scrambled with different scrambling IDs, and the DCIs may be transmitted in CORESETS belonging to different CORESET groups. (A CORESET group may be identified by an index defined in a CORESET configuration of each CORESET. For example, when index=0 is configured for CORESET 1 and CORESET 2, and index=1 is configured for CORESET 3 and CORESET 4, CORESET 1 and CORESET 2 belong to CORESET group 0, and CORESET 3 and CORESET 4 belong to CORESET group 1. When no index is defined for a CORESET, the index may be interpreted as 0). When a plurality of scrambling IDs or two or more CORESET groups are configured in one serving cell, the UE may identify that it should receive data by the multi-DCI-based MTRP operation.

For example, the single DCI-based MTRP scheme or the multi-DCI-based MTRP scheme may be indicated to the UE by separate signaling. For example, when multiple CRS patterns are indicated to the UE, for an MTRP operation in one serving cell, PDSCH rate matching for the CRS may vary depending on whether the single DCI-based MTRP scheme or the multi-DCI based MTRP scheme is used.

A CORESET group ID described/mentioned in the disclosure may refer to an index/identification information (e.g. an ID) that identifies a CORESET for each TRP/panel. A CORESET group may be a group/union of CORESETs identified by an index/identification information (e.g. an ID)/a CORESET group ID used to identify a CORESET for each TRP/panel. For example, a CORESET group ID may be specific index information defined in a CORSET configuration. For example, a CORESET group may be configured/indicated/defined by an index defined in a CORESET configuration for each CORESET. And/or a CORESET group ID may refer to an index/identification information/an indicator for distinguishing/identifying CORESETs configured for/related to each TRP/panel, and a CORESET group ID described/mentioned in this document may be replaced with a specific index/specific identification information/a specific indicator for distinguishing/identifying CORESETs configured for/related to each TRP/panel. The CORESET group ID described/mentioned, that is, the specific index/specific identification information/specific indicator for distinguishing/identifying CORESETs configured for/related to each TRP/panel may be configured/indicated by higher layer signaling (e.g. RRC signaling)/L2 signaling (e.g. MAC-CE)/L1 signaling (e.g. DCI). For example, it may be configured/indicated that PDCCH detection is performed on a CORESET group basis for each TRP/panel, and/or it may be configured/indicated that UCI (e.g. CSI, HARQ-A/N, and SR) and/or UL physical channel resources (e.g. PUCCH/PRACH/SRS resources) are managed/controlled separately on a CORESET group basis for each TRP/panel, and/or an HARQ A/N (process/retransmission) for a PDSCH/PUSCH scheduled for each TRP/panel may be managed on a CORESET group basis.

Description of Partially Overlapped NCJT

Further, NCJT is divided into fully overlapped NCJT in which time and frequency resources transmitted by TPs are wholly overlapped, and partially overlapped NCJT in which only some of time and frequency resources transmitted by TPs are overlapped with each other. That is, in the case of partially overlapped NCJT, both TP 1 and TP2 transmit data in some time and frequency resources, and only one of TP 1 or TP 2 transmits data in the other time and frequency resources.

Method of Increasing Reliability in Multi-TRP

Figure 13:
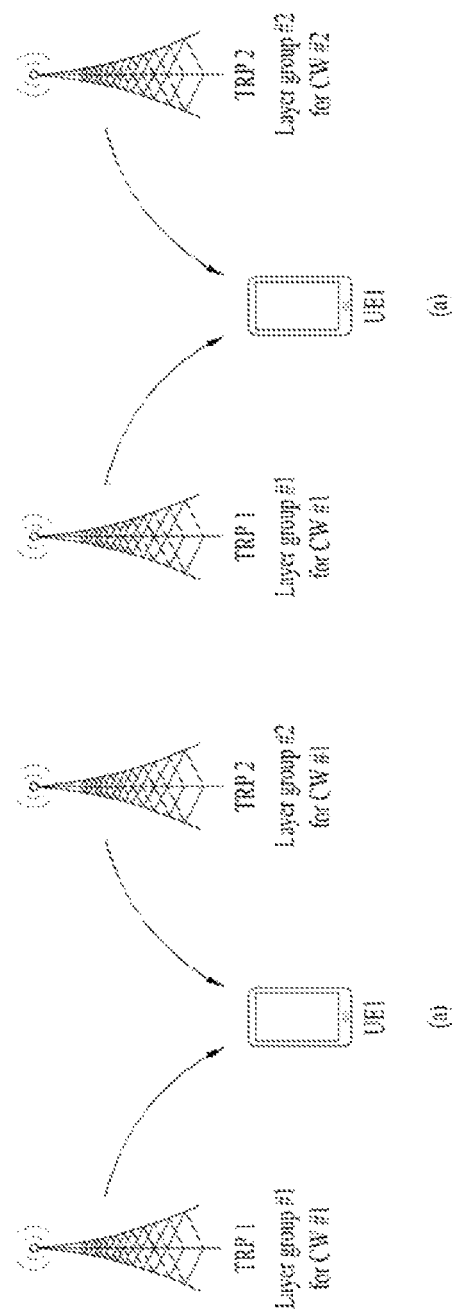
FIG. 13 is a diagram illustrating a transmission/reception method for increasing reliability during transmission using a plurality of transmission reception points (TRPs) according to an embodiment.

FIG. 13 is a diagram illustrating a transmission/reception method for increasing reliability during transmission using multiple TRPs.

Specifically, FIG. 13 illustrates two exemplary transmission/reception methods which may increase reliability during transmission through multiple TRPs.

FIG. 13(a) illustrates a case in which layer groups for transmitting the same codeword (CW)/TB correspond to different TRPs. A layer group may mean a set of one or more layers. In this case, the amount of transmission resources is increased due to a plurality of layers, and thus a TB may be subjected to robust channel coding with a low code rate. In addition, since the UE receives the same CW on different channels from a plurality of TRPs, the UE may obtain a diversity gain, thereby increasing the reliability of the received signal.

FIG. 13(b) illustrates an example of transmitting different CWs in layer groups corresponding to different TRPs. It is assumed herein that TBs corresponding to CW #1 and CW #2 are the same. Therefore, it may be seen as an example of repeated transmissions of the same TB. A shortcoming with the illustrated case of FIG. 13(b) may lie in that a code rate corresponding to a TB is higher than that in FIG. 13(a). However, the code rate may be adjusted by indicating different RV values for encoding bits generated from the same TB or the modulation order of each CW may be controlled, according to a channel environment.

In FIG. 13(a)/(b), as the same TB is repeatedly transmitted through different layer groups, and each layer group is transmitted through a different TRP/panel, a data reception probability may be increased. This scheme is referred to as a spatial division multiplexing (SDM)-based M-TRP URLLC transmission scheme. Layers belonging to different layer groups are transmitted through DMRS ports belonging to different DMRS CDM groups, respectively.

Further, while M-TRP transmission has been described above in the context of SDM using different layers, it is obvious that the M-TRP transmission may also be extended to frequency division multiplexing (FDM) based on different frequency-domain resources (e.g., (sets of) RBs/PRBs) and/or time division multiplexing (TDM) based on different time-domain resources (e.g., slots, symbols, or sub-symbols).

A detailed description will be given of MTRP URLLC.

In methods according to the following embodiments, DL MTRP-URLLC means that multiple TRPs transmit the same data/DCI in different layer/time/frequency resources. For example, TRP 1 transmits first data/DCI in resource 1, and TRP 2 transmits the first data/DCI in resource 2. QCL RSs/types, that is, DL TCI states to be used in the different layer/time/frequency resources carrying the same data/DCI are indicated to the UE by the BS. For example, when the same data/DCI is received in resource 1 and resource 2, the BS indicates a DL TCI state used in resource 1 and a DL TCI state used in resource 2 to the UE. Since the UE receives the same data/DCI in resource 1 and resource 2, high reliability may be achieved. This DL MTRP URLLC may be applied to a PDSCH/PDCCH.

In contrast, UL MTRP-URLLC means that multiple TRPs receive the same data/UCI in different layer/time/frequency resources from one UE. For example, TRP 1 receives first data/DCI in resource 1 from a first UE, and TRP 2 receives the first data/DCI in resource 2 from the first UE. Then, TRP 1 and TRP 2 share the received data/DCI through a backhaul connected between TRP 1 and TRP 2. A UE configured with UL MTRP-URLLC transmission transmits the same data/UCI to different TRPs in different layer/time/frequency resources. Tx beams and Tx power, that is, UL TCI states to be used in layer/time/frequency resources carrying the same data/UCI are indicated to the UE by the BS. For example, when the UE transmits the same data/UCI in resource 1 and resource 2, the BS indicates a UL TCI state to be used for resource 1 and a UL TCI state to be used for resource 2 to the UE. This UL MTRP URLLC may be applied to a PUSCH/PUCCH.

In the methods proposed according to embodiments of the disclosure, using(/mapping) a specific TCI state (or TCI) in receiving data/DCI/UCI in a specific frequency/time/space resource may amount estimating a channel from a DMRS using a QCL type and a QCL RS indicated by the TCI state in the frequency/time/spatial resource, and receiving/demodulating data/DCI based on the estimated channel, in DL. In UL, it may amount to transmitting/modulating a DMRS and data/UCI using a Tx beam and/or Tx power indicated by the TCI state in the frequency/time/spatial resource.

The UL TCI state may include Tx beam or Tx power information for the UE, and may be configured for the UE by other parameters such as Spatial-Relation_Info (SRI) instead of the TCI state. The UL TCI state may be directly indicated by UL grant DCI or may mean spatial relation info about an SRS resource indicated by the SRI field of the UL grant DCI. Or the UL TCI state may mean an OL Tx power control parameter (j: index for open loop parameters Po & alpha (maximum 32 parameter value sets per cell) connected to the value indicated through the SRI field of the UL grant DCI, q_d: index of DL RS resource for PL measurement (maximum 4 measurements per cell), l: closed loop power control process index (maximum 2 processes per cell)) linked to a value indicated by the SRI field of the UL grant DCI.

MTRP-eMBB refers to transmission of different data in different layers/times/frequencies from multiple TRPs, and a UE configured with MTRP-eMBB transmission is notified of multiple TCI states by DCI and assumes that data received using QCL RSs corresponding to the TCI states are different data.

As an RNTI for MTRP-URLLC and an RNTI for MTRP-eMBB are used separately, the UE may distinguish an MTRP URLLC transmission/reception from an MTRP eMBB transmission/reception. That is, when DCI is CRC-masked with the RNTI for URLLC, the UE may identify a URLLC transmission, and when DCI is CRC-masked with the RNTI for eMBB, the UE may identify an eMBB transmission. Alternatively, the BS may configure an MTRP URLLC transmission/reception or an MTRP eMBB transmission/reception for the UE by other new signaling.

While the proposed methods are applied on the assumption of cooperative transmission/reception between two TRPs for convenience of description in the disclosure, this is merely an embodiment, and the disclosure may be extended to an environment with three or more TRPs, and a multi-panel environment. Different TRPs may be recognized as different TCI states to the UE, and when the UE receives/transmits data/DCI/UCI using TCI state 1, this implies that the UE receives/transmits data/DCI/UCI from/to TRP 1.

Embodiments according to the disclosure may be used in a situation in which MTRPs transmit a PDCCH cooperatively, that is, repeatedly transmits or divides the same PDCCH, and some proposals may be used even when MTRPs cooperatively transmit a PDSCH or cooperatively receive a PUSCH/PUCCH.

In the following embodiments, repeated transmissions of the same PDCCH from a plurality of BSs (i.e. MTRPs) may amount to transmission of the same DCI in a plurality of PDCCH candidates, and repeated transmissions of the same DCI from a plurality of BSs.

The same DCI may mean two DCIs having the same DCI format/size/payload. Alternatively, even though the payloads of two DCIs are different, when their scheduling result is the same, the two DCIs may be said to be the same DCI. For example, a time domain resource allocation (TDRA) field of DCI determines a relative slot/symbol position of data and a relative slot/symbol position of an Ack/Nack based on a DCI reception time. When DCI received at time n and DCI received at time n+1 indicate the same scheduling result to the UE, the TDRA fields of the two DCIs are different, and as a result, their DCI payload is inevitably different. A repetition number R may be directly indicated to the UE by the BS or pre-agreed between the UE and the BS. Alternatively, even though two DCIs have different payload and different scheduling results, when the scheduling result of one DCI is a subset of the scheduling result of the other DCI, the two DCIs may be regarded as the same DCI. For example, when the same data is TDMed and repeatedly transmitted N times, DCI 1 received before first data indicates N data repetitions, and DCI 2 received after the first data transmission and before a second data transmission indicates N−1 data repetitions. In this case, scheduling data of DCI 2 is a subset of scheduling data of DCI 1, and since both DCIs schedule the same data, these DCIs may also be said to be the same DCI.

In the following embodiments, when it is said that a plurality of BSs (i.e. MTRPs) transmit the same PDCCH separately, this may imply that one DCI is transmitted in one PDCCH candidate, and TRP 1 transmits some of resources defined as the PDCCH candidate, whereas TRP 2 transmits the remaining resources. For example, when TRP 1 and TRP 2 separately transmit a PDCCH candidate corresponding to an aggregation level m1+m2, the PDCCH candidate is divided into PDCCH candidate 1 corresponding to an aggregation level m1 and PDCCH candidate 2 corresponding to an aggregation level m2. Then, TRP 1 may transmit PDCCH candidate 1 and TRP 2 may transmit PDCCH candidate 2, using different time/frequency resources. In this case, after receiving PDCCH candidate 1 and PDCCH candidate 2, the UE generates the PDCCH candidate corresponding to the aggregation level m1+m2 and attempts DCI decoding.

Specifically, the same DCI may be transmitted separately in a plurality of PDCCH candidates according to the following two implementation methods.

In one of the methods, DCI payload (control information bits+CRC) is encoded by one channel encoder (e.g. polar encoder), and the resulting coded bits are separately transmitted by two TRPs. In this case, the entire DCI payload or only part of the DCI payload may be encoded to the coded bits transmitted by each TRP.

In the other method, DCI payload (control information bits+CRC) is divided into two parts (DCI 1 and DCI 2), and each of the two parts is encoded by a channel encoder (e.g. polar encoder). Thereafter, two TRPs transmit coded bits corresponding to DCI 1 and coded bits corresponding to DCI 2, respectively.

It may be understood that a PDCCH is transmitted multiple times in multiple transmission occasions (TOs) regardless whether the PDCCH is transmitted repeatedly or separately. A TO refers to a specific time/frequency resource unit carrying a PDCCH. For example, when the PDCCH is transmitted multiple times over slots 1, 2, 3, and 4 (in a specific RB), each slot may be a TO, and when the PDCCH is transmitted multiple times in RB sets 1, 2, 3, and 4 (in a specific slot), each RB set may be a TO. Alternatively, when the PDCCH is transmitted multiple times in different time and frequency resources, each time/frequency resource may be a TO. In addition, a TCI state used for DMRS channel estimation may be configured differently for each TO, and it may be assumed that a TO configured with a different TCI state is transmitted by a different TRP/panel. When a plurality of BSs repeatedly or separately transmit a PDCCH, this means that the PDCCH is transmitted in multiple TOs, and the union of TCI states configured for the TOs includes two or more TCI states. For example, when the PDCCH is transmitted in TOs 1, 2, 3, and 4, TCI states 1, 2, 3, and 4 may be configured respectively for TOs 1, 2, 3, and 4, which means that TRP i cooperatively transmits in TO i.

In the following embodiments, when it is said that the UE repeatedly transmits the same PUSCH to a plurality of BSs (i.e. MTRPs), this may mean that the same data is transmitted on a plurality of PUSCHs, and each PUSCH may be transmitted optimized for a UL channel of a different TRP. For example, when the UE repeatedly transmits the same data on PUSCH 1 and PUSCH 2, the UE transmits PUSCH 1 using UL TCI state 1 for TRP 1 by receiving a link adaptation value such as a precoder/MCS, optimized for the channel of TRP 1, scheduled by the BS and applying it. On the other hand, the UE transmits PUSCH 2 by using UL TCI state 2 for TRP 2 by receiving a link adaptation value such as a precoder/MCS, optimized for the channel of TRP 2, scheduled by the BS and applying it. In this case, the repeatedly transmitted PUSCH 1 and PUSCH 2 may be transmitted in TDM at different time points, FDM, or SDM.

In the following embodiments, when it is said that the UE repeatedly transmits the same PUSCH to a plurality of BSs (i.e. MTRPs), this may mean that the same data is transmitted on a plurality of PUSCHs by dividing resources allocated to the PUSCH and optimizing the divided resources for UL channels of the different TRPs. For example, when the UE transmits the same data on a 10-symbol PUSCH, the UE may transmit the first 5 symbols using UL TCI state 1 for TRP 1 by receiving a scheduled value optimized for the channel of TRP 1, for link adaptation such as a precoder/MCS, from the BS and applying it. The UE may transmit the remaining 5 symbols using UL TCI state 2 for TRP 2 by receiving a scheduled value optimized for the channel of TRP 2, for link adaptation such as a precoder/MCS, from the BS and applying it. While one PUSCH is divided into time resources and two divided PUSCH transmissions are TDMed as a transmission to TRP 1 and a transmission to TRP 2 in the above embodiment, the transmissions may also be FDMed/SDMed.

Like the PUSCH transmission, the UE may repeatedly or separately transmit the same PUCCH, so that a plurality of BSs (i.e., MTRPs) may receive the PUCCH.

According to the disclosure, the proposals may be extended to various channels such as PUSCH/PUCCH/PDSCH/PDCCH.

The proposals of the disclosure may be extended to both of repeated transmissions of the channel in different time/frequency/space resources and separate transmissions of the channel in different time/frequency/space resources.

Embodiments of the disclosure relate to methods of effectively configuring/indicating a TPMI and/or an SRI, when a codebook-based/non-codebook-based PUSCH is transmitted to MTRPs. While the disclosure is described in the context of MTRPs for convenience of description, the disclosure may be extended to a multi-cell environment and equally applied to/configured for UL transmission to multiple cells. That is, PUSCH scheduling for multiple cells may be performed at one time by a single DCI. Herein, the following proposals may be used to configure and apply a TPMI/SRI field for and to a PUSCH for each cell.

Proposal 1: When the UE performs PUSCH transmission to one or more TRPs through the same number of antenna ports (e.g., PUSCH ports) using one or more panels (or antennas), the following may be considered for effective TPMI indication.

Alt 1: A plurality of TRI+TPMI fields in DCI are indications/configurations for UL PUSCH transmissions to a plurality of (M) TRPs, respectively. On the assumption that the TRIs for the plurality of TRPs are identical, a TRI+TPMI is indicated to a first TRP, and a TRI for an $n^{th}$ TRP (n=2, . . . , M) is determined according to the TRI of the first TRP, and the TRI+TPMI fields include only TPMIs. Therefore, DCI overhead may be reduced. The TRP (e.g., the first TRP) (e.g., a TRP with a lowest index/id) to which the TRI is indicated may be determined based on a TCI state ID associated with Coresetpoolindex/CoresetID/TRP related to the TRP.

For the description of Alt 1, the following Table 10 is referred to.

TABLE 10

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| . . . | . . . | . . . | . . . | . . . | . . . |
| 3 | 1 layer: TPMI = 3 | 3 | 1 layer: TPMI = 3 | 3 | 1 layer: TPMI = 3 |

TABLE 10-continued

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 4 | 2 layers: TPMI = 0 | 4 | 2 layers: TPMI = 0 | 4 | 2 layers: TPMI = 0 |
| ... | ... | ... | ... | ... | ... |
| 9 | 2 layers: TPMI = 5 | 9 | 2 layers: TPMI = 5 | 9 | 2 layers: TPMI = 5 |
| 10 | 3 layers: TPMI = 0 | 10 | 3 layers: TPMI = 0 | 10 | 3 layers: TPMI = 0 |
| 11 | 4 layers: TPMI = 0 | 11 | 4 layers: TPMI = 0 | 11 | 4 layers: TPMI = 0 |
| 12 | 1 layer: TPMI = 4 | 12 | 1 layer: TPMI = 4 | 12-15 | reserved |
| ... | ... | ... | ... | | |
| 19 | 1 layer: TPMI = 11 | 19 | 1 layer: TPMI = 11 | | |
| 20 | 2 layers: TPMI = 6 | 20 | 2 layers: TPMI = 6 | | |
| ... | ... | ... | ... | | |
| 27 | 2 layers: TPMI = 13 | 27 | 2 layers: TPMI = 13 | | |
| 28 | 3 layers: TPMI = 1 | 28 | 3 layers: TPMI = 1 | | |
| 29 | 3 layers: TPMI = 2 | 29 | 3 layers: TPMI = 2 | | |
| 30 | 4 layers: TPMI = 1 | 30 | 4 layers: TPMI = 1 | | |

As shown in Table 10, a TRI and a TPMI are jointly encoded. For example, 'bit field mapped to index' may be configured by DCI. For example, the bit width of a Precoding information and number of layers field in the DCI may be determined based on a higher layer configuration (e.g. txConfig/maxRank/codebookSubset), and 'bit field mapped to index' may be indicated by this DCI field.

The numbers of per-rank per-codebook subset TPMIs according to numbers of ranks may be listed as illustrated in Table 11 and Table 12 below, based on Table 10. Table 11 is for a case of four ranks, and Table 12 is for a case of two ranks.

TABLE 11

| | codebookSubset = fullyAndPartialAndNonCoherent | codebookSubset = partialAndNonCoherent | codebookSubset = nonCoherent |
|---|---|---|---|
| Rank1 | 28 | 12 | 4 |
| Rank2 | 22 | 14 | 6 |
| Rank3 | 7 | 3 | 1 |
| Rank4 | 5 | 3 | 1 |

TABLE 12

| | codebookSubset = fullyAndPartialAndNonCoherent | codebookSubset = nonCoherent |
|---|---|---|
| Rank1 | 6 | 2 |
| Rank2 | 3 | 1 |

For example, when a non-coherent codebook subset has been configured, and the TRI+TPMI field for TRP 1 indicates 4, that is, 2 layers: TPMI=0, the TPMI field for TRP2 indicates only a TPMI in 3 bits on the assumption of a rank of 2. That is, a conventional method requires 4 bits, whereas the proposed method requires only 3 bits. When this method is used, values indicated by the TRI+TPMI field and an actually used TRI/TPMI mapping table need to be re-defined.

Additionally, when the size of the TPMI field for TRP 2 is changed according to the rank of TRP 1 in the above method, the payload size of the whole DCI is changed, thereby increasing DCI blind detections (BDs) of the UE. Accordingly, the size of a TPMI field for an $n^{th}$ TRP (e.g., n=2, 3, 4, . . . ) should be fixed to prevent the increase of DCI BDs at the UE. For this purpose, for example, the size of the TPMI field may be determined based on the largest of the numbers of TPMIs for respective ranks. For example, referring to Table 11 and Table 12, for 4Tx, the size of the TPMI field should be fixed to 5 bits (i.e., the largest number of TPMIs is 28 for rank=1) when codebookSubset=fullyAndPartialAndNonCoherent, to 4 bits (i.e., the largest number of TPMIs is 14 for rank=2) when codebookSubset=partialAndNonCoherent, and to 3 bits (i.e., the largest number of TPMIs is 6 for rank=2) when codebookSubset=nonCoherent. Considering that the number of per-rank TPMIs is for rank 1 or rank 2, the size of the bit field is not changed even though max rank restriction is indicated. For 2Tx, the size of the TPMI field should be fixed to 3 bits (i.e., the largest number of TPMIs is 6 for rank=1) when codebookSubset=fullyAndPartialAndNonCoherent, and to 1 bit (i.e., the largest number of TPMIs is 2 for rank=1) when codebookSubset=nonCoherent. In this manner, the bit field indicating a TPMI for an $n^{th}$ TRP is configured. In the above method, it may be assumed that the number of ports for SRS resources is equal for each TRP.

Alt 2: In Alt 1, a TRI is configured/indicated individually for each TRP or commonly for all TRPs, and each field of DCI indicates/configures only a per-TRP TPMI corresponding to the TRP. The field size of the TPMI may be configured/applied in the same manner as in Alt 1.

Alt 3: Because a dedicated SRS resource for each TRP may be preconfigured according to a specific method/rule in MTRP codebook-based UL, the indication of an SRI field is omitted, and this field is used for TRI and/or TPMI indication for an $n^{th}$ TRP. That is, a TRI and/or TPMI for the $n^{th}$ TRP may be indicated by the SRI field. For example, TRP_1: TRI_1+TPMI_1 is indicated, and TRP_2: TRI_2+TPMI_2 is indicated. A subscript denotes an $n^{th}$ TRP. Accordingly, a different number of SRS ports may be configured for each TRP.

Alt 4: A method in which the rank is equal for each TRP may not be suitable for an actual radio channel environment. In this context, more loose restriction may be considered for the TRI of a PUSCH transmission for one TRP. That is, based on the rank of a TRP in the best radio channel environment (e.g., the BS may determine a rank for each TRP based on CSI received from the UE), the rank of another TRP may be indicated as less than the reference rank (e.g., Alt 4-1). Alternatively, a TRI+TPMI may be indicated for the TRP in the best radio channel environment, and a rank for another TRP may be predefined as a specific value (e.g., Alt 4-2).

Alt 4-1: It is assumed that TRI_1>TRI_2. For example, when the TRI of TRP 1 is 2, the TRI of TRP 2 is assumed to be 1. In another example, when the TRI of TRP 1 is 3, the TRI of TRP 2 is assumed to be 1 or 2. In this case, the TRI+TPMI field for TRP 2 is limited to indicate up to rank 2. It may be pre-agreed that when TRI_1=1, TRI_2 is assumed to be 1 or dropped. Alternatively, it is assumed that TRI_1>=TRI_2.

Alt 4-2: A TRI+TPMI is indicated for TRP 1, and the rank of TRP 2 is preset to a specific value (e.g., Rank=1). Therefore, a TRI indication is omitted for TRP 2, thereby reducing the payload of DCI.

Alt 5: In MTRP codebook-based UL transmission, only a TRI+TPMI transmission associated with a specific rank combination may be indicated without defining all TRI+TPMI combinations to reduce payload. For example, TRI+TPMI indications are made for combinations of rank 1+1, rank 2+2, and rank 1+2. Table 13 is merely an example taken for convenience of description, not limiting the technical scope of the disclosure. Although a conventional per-TRP transmission needs a total of 8 bits (4 bits+4 bits), the proposal needs 6 bits, saving 2 bits.

TABLE 13

| Bit field mapped to index | codebookSubset = fullyAndPartialAndNonCoherent |
|---|---|
| 0 | 1 layer: TPMI = 0, 1 layer: TPMI = 0 |
| 1 | 1 layer: TPMI = 0, 1 layer: TPMI = 1 |
| 2 | 1 layer: TPMI = 0, 1 layer: TPMI = 2 |
| 3 | 1 layer: TPMI = 0, 1 layer: TPMI = 3 |
| 4 | 1 layer: TPMI = 0, 1 layer: TPMI = 4 |
| 5 | 1 layer: TPMI = 0, 1 layer: TPMI = 5 |
| 6 | 1 layer: TPMI = 1, 1 layer: TPMI = 0 |
| 7 | 1 layer: TPMI = 1, 1 layer: TPMI = 1 |
| 8 | 1 layer: TPMI = 1, 1 layer: TPMI = 2 |
| 9 | 1 layer: TPMI = 1, 1 layer: TPMI = 3 |
| 10 | 1 layer: TPMI = 1, 1 layer: TPMI = 4 |
| 11 | 1 layer: TPMI = 1, 1 layer: TPMI = 5 |
| 12 | 1 layer: TPMI = 2, 1 layer: TPMI = 0 |
| 13 | 1 layer: TPMI = 2, 1 layer: TPMI = 1 |
| 14 | 1 layer: TPMI = 2, 1 layer: TPMI = 2 |
| 15 | 1 layer: TPMI = 2, 1 layer: TPMI = 3 |
| 16 | 1 layer: TPMI = 2, 1 layer: TPMI = 4 |
| 17 | 1 layer: TPMI = 2, 1 layer: TPMI = 5 |
| 18 | 1 layer: TPMI = 3, 1 layer: TPMI = 0 |
| 19 | 1 layer: TPMI = 3, 1 layer: TPMI = 1 |
| 20 | 1 layer: TPMI = 3, 1 layer: TPMI = 2 |
| 21 | 1 layer: TPMI = 3, 1 layer: TPMI = 3 |
| 22 | 1 layer: TPMI = 3, 1 layer: TPMI = 4 |
| 23 | 1 layer: TPMI = 3, 1 layer: TPMI = 5 |
| 24 | 1 layer: TPMI = 4, 1 layer: TPMI = 0 |
| 25 | 1 layer: TPMI = 4, 1 layer: TPMI = 1 |
| 26 | 1 layer: TPMI = 4, 1 layer: TPMI = 2 |
| 27 | 1 layer: TPMI = 4, 1 layer: TPMI = 3 |
| 28 | 1 layer: TPMI = 4, 1 layer: TPMI = 4 |
| 29 | 1 layer: TPMI = 4, 1 layer: TPMI = 5 |
| 30 | 1 layer: TPMI = 5, 1 layer: TPMI = 0 |
| 31 | 1 layer: TPMI = 5, 1 layer: TPMI = 1 |
| 32 | 1 layer: TPMI = 5, 1 layer: TPMI = 2 |
| 33 | 1 layer: TPMI = 5, 1 layer: TPMI = 3 |
| 34 | 1 layer: TPMI = 5, 1 layer: TPMI = 4 |
| 35 | 1 layer: TPMI = 5, 1 layer: TPMI = 5 |
| 36 | 1 layer: TPMI = 0, 2 layer: TPMI = 0 |
| 37 | 1 layer: TPMI = 0, 2 layer: TPMI = 1 |
| 38 | 1 layer: TPMI = 0, 2 layer: TPMI = 2 |
| 39 | 1 layer: TPMI = 1, 2 layer: TPMI = 0 |
| 40 | 1 layer: TPMI = 1, 2 layer: TPMI = 1 |
| 41 | 1 layer: TPMI = 1, 2 layer: TPMI = 2 |
| 42 | 1 layer: TPMI = 2, 2 layer: TPMI = 0 |
| 43 | 1 layer: TPMI = 2, 2 layer: TPMI = 1 |
| 44 | 1 layer: TPMI = 2, 2 layer: TPMI = 2 |
| 45 | 1 layer: TPMI = 3, 2 layer: TPMI = 0 |
| 46 | 1 layer: TPMI = 3, 2 layer: TPMI = 1 |
| 47 | 1 layer: TPMI = 3, 2 layer: TPMI = 2 |
| 48 | 1 layer: TPMI = 4, 2 layer: TPMI = 0 |
| 49 | 1 layer: TPMI = 4, 2 layer: TPMI = 1 |
| 50 | 1 layer: TPMI = 4, 2 layer: TPMI = 2 |
| 51 | 1 layer: TPMI = 5, 2 layer: TPMI = 0 |
| 52 | 1 layer: TPMI = 5, 2 layer: TPMI = 1 |
| 53 | 1 layer: TPMI = 5, 2 layer: TPMI = 2 |
| 54-63 | Reserved |

Alt 6: In order to reduce payload in MTRP codebook based-UL transmission, a single TRI+TPMI field indicates a TPMI corresponding only to an even-numbered rank (e.g. Rank 2 and Rank 4). For the indicated TPMI, TRP 1 and TRP 2 divide a precoding vector according to a specific rule and use the divided precoding vectors for PUSCH transmission. For example, when a rank 4 TPMI is indicated, TRP 1 uses layer 1 and layer 2 of the TPMI (i.e., the first and second vectors of a corresponding precoding matrix), and TRP 2 uses layer 3 and layer 4 (i.e., the third and fourth vectors of the corresponding precoding matrix). A TRP-to-layer mapping method may be indicated by a higher layer (e.g., RRC/MAC-CE/DCI).

Alt 7: It may pre-agreed that once an MTRP transmission is configured, even a full coherent UE also uses a partial coherent TPMI set or a non-coherent TPMI set. This is a method of restricting the UE to use a codebook subset of a smaller size to reduce payload, even though the UE has a coherency capability.

Proposal 2: When the UE performs PUSCH transmission for one or more TRPs through the same number of antenna ports (PUSCH ports) using a plurality of panels (or antennas), codebook (CB) subset restriction/CB subsampling may be indicated/configured to reduce DCI overhead.

CB subsampling refers to a method of indicating a TRI/TPMI using only some of the TPMIs captured in 3GPP TS 38.211. Various subsampling methods are available, including the following example. Further, when codebook subsampling is applied, DCI payload may be reduced by reconstructing the TRI+TPMI field with only subsets configured/applied by codebook subsampling.

TABLE 14

| TPMI index | W (ordered from left to right in increasing order of TPMI index) | | | | | |
|---|---|---|---|---|---|---|
| 0-5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ |

Table 14 illustrates an example of a rank 1 UL codebook for 2Tx (a precoding matrix w for single-layer transmission using two antenna ports). In the table, W may sequentially correspond to TPMI indexes on the horizontal axis. Among the TPMI indexes, TPMIs 2, 3, 4 and 5, which are port combining TPMIs, may be expressed in QPSK. When subsampling is indicated, it may be indicated/configured that only TPMIs 2 and 4 or TPMIs 3 and 5 corresponding to BPSK are used. Accordingly, a TPMI set configured during CB subsampling may be {0, 1, 2, 4} or {0, 1, 3, 5}. For example, when CB subsampling is enabled, the number of rank 1 TPMIs is reduced from 6 to 4, and thus DCI overhead may be reduced by 1 bit.

TABLE 15

| TPMI index | W (ordered from left to right in increasing order of TPMI index) | | |
|---|---|---|---|
| 0-2 | $\frac{1}{\sqrt{2}}\begin{bmatrix}1 & 0\\0 & 1\end{bmatrix}$ | $\frac{1}{2}\begin{bmatrix}1 & 1\\1 & -1\end{bmatrix}$ | $\frac{1}{2}\begin{bmatrix}1 & 1\\j & -j\end{bmatrix}$ |

Table 15 illustrates an example of a rank 2 UL codebook for 2Tx (a precoding matrix w for two-layer transmission using two antenna ports with transform precoding disabled). TPMIs 1 and 2 may be port combining TPMIs. When subsampling is indicated, it may be indicated/configured that only TPMIs {0, 1} or TPMIs {0, 2} are used. Alternatively, when subsampling is enabled with a full rank transmission, it may be pre-agreed that only rank 2 TPMI 0 is used.

The codebook subsampling method for 2Tx may include a combination of the above-described per-rank subsampling methods.

The following tables list TPMIs of DFT-s-OFDM.

Table 16 below illustrates an example of a rank 1 UL codebook for 4Tx (a precoding matrix w for single-layer transmission using four antenna ports with transform precoding enabled).

TABLE 16

| TPMI index | W (ordered from left to right in increasing order of TPMI index) | | | | | | | |
|---|---|---|---|---|---|---|---|---|
| 0-7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ | — | — | — | — |

When codebook subsampling is applied to the TPMIs, the same two subsampling methods may exist. For example, subsampling may be performed based on co-phasing between ports/port groups.

Method 1)

TPMI set={0, 1, 2, 3, 4, 6, 8, 10, 12, 13, 14, 15, 20, 21, 22, 23} or

TPMI set={0, 1, 2, 3, 5, 7, 9, 11, 16, 17, 18, 19, 24, 25, 26, 27}

The subsampling is the result of taking BPSK in inter-port or inter-port group co-phasing. That is, for example, regarding TPMI group 1={12-15} and TPMI group 2={20-23}, these groups are a group combination in which the co-phase between a group of ports 1 and 3 and a group of ports 2 and 4 is −1 (i.e., a 180-degree difference). In other words, in the case of TPMI 12 and TPMI 20, multiplication of port 2 and port 4 by −1 in TPMI 12 leads to TPMI 20. Likewise, regarding TPMI group 3={16-19} and TPMI group 4={24-27}, these groups are also a group combination in which the co-phase between the group of ports 1 and 3 and the group of ports 2 and 4 is −1 (i.e., a 180-degree difference). That is, the combination is a subsampling method that increases the granularity between port groups in consideration of the co-phase={1 or −1} between specific antenna port groups (e.g., a port group {1, 3} and a port group {2, 4}).

Method 2)

TPMI set={0, 1, 2, 3, 4, 6, 8, 10, 12, 13, 14, 15, 16, 17, 18, 19} or

TPMI set={0, 1, 2, 3, 5, 7, 9, 11, 20, 21, 22, 23 24, 25, 26, 27}

In the subsampling method of method 2), TPMIs are combined such that TPMI group 1 and TPMI group 3 or TPMI group 2 and TPMI group 4 have different codebook configurations of (that is, with no correlation between the group of ports 1 and 3 and the group of ports 2 and 4).

The codebook subsampling method may be configured/applied differently according to a codebook subset that the BS configures based on a coherency capability reported by the UE. For example, in the case of a full coherent codebook subset, method 1 may be selected, whereas in the case of a partial coherent codebook subset in which the co-phase between antenna port groups is not important, method 2 may be selected.

Another method may also be considered, in which a different combination (e.g., TPMIs 12-15 and TPMIs 16-20) is selected from among the corresponding TPMI groups. When subsampling is enabled by applying the proposed subsampling, in the case of the "full coherent" codebook subset, the total payload is advantageously reduced from 5 bits to 4 bits.

Table 17 below illustrates an example of a 4Tx rank 1 UL codebook (a precoding matrix w for single-layer transmission using four antenna ports with transform precoding disabled).

TABLE 17

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ — — — — |

The above-described principle may be applied in a similar manner to a rank 1 UL codebook for 4Tx CP-OFDM according to Table 17, and the same two subsampling methods are available.

TPMI set={0, 1, 2, 3, 4, 6, 8, 10, 12, 14, 16, 18, 20, 22, 24, 26}

TPMI set={0, 1, 2, 3, 5, 7, 9, 11, 13, 15, 17, 19, 21, 23, 25, 27}

The subsampling is the result of taking BPSK in inter port or inter port group co-phasing.

That is, TPMI group 1={12, 14, 16, 18}, TPMI group 2={13, 15, 17, 19}, TPMI group 3={20, 22, 24, 26}, and TPMI group 4={21, 23, 25, 27} are the result of selecting groups with a co-phase difference of 180 degrees from among groups in which the co-phases between the group of ports 1 and 3 and the group of ports 2 and 4 are 1/j/−1/−j, respectively. Another method may be considered, in which a different combination (e.g., group 1+group 2 or group 3+group 4) is selected from among the TPMI groups. In the case where the proposed subsampling is applied, when the subsampling is enabled, the total payload is advantageously reduced from 5 bits to 4 bits in the case of the "full coherent" codebook subset.

The codebook subsampling method may be configured/applied differently according to a codebook subset that the BS configures based on a coherency capability reported by the UE.

Table 18 below illustrates an example of a 4Tx rank 2 UL codebook (a precoding matrix w for two-layer transmission using four antenna ports with transform precoding disabled).

TABLE 18

| TPMI index | W (orderd from left to right in increasing order of TPMI index) | | | |
|---|---|---|---|---|
| 0-3 | $\frac{1}{2}\begin{bmatrix}1&0\\0&1\\0&0\\0&0\end{bmatrix}$ | $\frac{1}{2}\begin{bmatrix}1&0\\0&0\\0&1\\0&0\end{bmatrix}$ | $\frac{1}{2}\begin{bmatrix}1&0\\0&0\\0&0\\0&1\end{bmatrix}$ | $\frac{1}{2}\begin{bmatrix}0&0\\1&0\\0&1\\0&0\end{bmatrix}$ |
| 4-7 | $\frac{1}{2}\begin{bmatrix}0&0\\1&0\\0&0\\0&1\end{bmatrix}$ | $\frac{1}{2}\begin{bmatrix}0&0\\0&0\\1&0\\0&1\end{bmatrix}$ | $\frac{1}{2}\begin{bmatrix}1&0\\0&1\\1&0\\0&-j\end{bmatrix}$ | $\frac{1}{2}\begin{bmatrix}1&0\\0&1\\1&0\\0&j\end{bmatrix}$ |
| 8-11 | $\frac{1}{2}\begin{bmatrix}1&0\\0&1\\-j&0\\0&1\end{bmatrix}$ | $\frac{1}{2}\begin{bmatrix}1&0\\0&1\\-j&0\\0&-1\end{bmatrix}$ | $\frac{1}{2}\begin{bmatrix}1&0\\0&1\\-1&0\\0&-j\end{bmatrix}$ | $\frac{1}{2}\begin{bmatrix}1&0\\0&1\\-1&0\\0&-j\end{bmatrix}$ |
| 12-15 | $\frac{1}{2}\begin{bmatrix}1&0\\0&1\\j&0\\0&1\end{bmatrix}$ | $\frac{1}{2}\begin{bmatrix}1&0\\0&1\\-j&0\\0&-1\end{bmatrix}$ | $\frac{1}{2\sqrt{2}}\begin{bmatrix}1&1\\1&1\\1&-1\\1&-1\end{bmatrix}$ | $\frac{1}{2\sqrt{2}}\begin{bmatrix}1&1\\1&1\\j&-j\\j&-j\end{bmatrix}$ |
| 16-19 | $\frac{1}{2\sqrt{2}}\begin{bmatrix}1&1\\j&j\\1&-1\\j&-j\end{bmatrix}$ | $\frac{1}{2\sqrt{2}}\begin{bmatrix}1&1\\j&j\\j&-j\\-1&1\end{bmatrix}$ | $\frac{1}{2\sqrt{2}}\begin{bmatrix}1&1\\-1&-1\\1&-1\\-1&1\end{bmatrix}$ | $\frac{1}{2\sqrt{2}}\begin{bmatrix}1&1\\-1&-1\\j&-j\\-j&j\end{bmatrix}$ |
| 20-21 | $\frac{1}{2\sqrt{2}}\begin{bmatrix}1&1\\-j&-j\\1&-1\\-j&j\end{bmatrix}$ | $\frac{1}{2\sqrt{2}}\begin{bmatrix}1&1\\-j&-j\\j&-j\\1&-1\end{bmatrix}$ | — | — |

The above-described principle may be applied in a similar manner to a rank 2 UL codebook for 4Tx CP-OFDM according to Table 18, and the same two subsampling methods are available.

TPMI set={0, 1, 2, 3, 4, 5, 6, 7, 10, 11, 14, 15, 18, 19}
TPMI set={0, 1, 2, 3, 4, 5, 8, 9, 12, 13, 16, 17, 20, 21}

The subsampling is the result of taking BPSK in inter port or inter port group co-phasing. That is, the subsampling is an example of a TPMI set with 1 and −1 as the co-phases of port 1 and port 3 and a TPMI set with j and −j as the co-phases of port 1 and port 3.

The codebook subsampling method may be configured/applied differently according to a codebook subset that the BS configures based on a coherency capability reported by the UE.

Table 19 below illustrates an example of a 4Tx rank 3 UL codebook (a precoding matrix w for three-layer transmission using four antenna ports with transform precoding disabled).

The above-described principle may be applied in a similar manner to a rank 3 UL codebook for 4Tx CP-OFDM according to Table 19, and the same two subsampling methods are available.

TPMI set={0, 1, 2, 3, 5}
TPMI set={0, 1, 2, 4, 6}
TPMI set={0, 1, 2} or TPMI set={0}

The last two TPMI set examples are the result of applying subsampling aggressively because a higher gain is achieved from an increased number of layers than from a codebook granularity in the case of rank 3, compared to rank 1 and rank 2.

The codebook subsampling method may be configured/applied differently according to a codebook subset that the BS configures based on a coherency capability reported by the UE.

TABLE 19

| TPMI index | W (ordered from left to right in increasing order of TPMI index) | | | |
|---|---|---|---|---|
| 0-3 | $\frac{1}{2}\begin{bmatrix}1&0&0\\0&1&0\\0&0&1\\0&0&0\end{bmatrix}$ | $\frac{1}{2}\begin{bmatrix}1&0&0\\0&1&0\\1&0&0\\0&0&1\end{bmatrix}$ | $\frac{1}{2}\begin{bmatrix}1&0&0\\0&1&0\\-1&0&0\\0&0&1\end{bmatrix}$ | $\frac{1}{2\sqrt{3}}\begin{bmatrix}1&1&1\\1&-1&1\\1&1&-1\\1&-1&-1\end{bmatrix}$ |
| 4-6 | $\frac{1}{2\sqrt{3}}\begin{bmatrix}1&1&1\\1&-1&1\\j&j&-j\\j&-j&-j\end{bmatrix}$ | $\frac{1}{2\sqrt{3}}\begin{bmatrix}1&1&1\\-1&1&-1\\1&1&-1\\-1&1&1\end{bmatrix}$ | $\frac{1}{2\sqrt{3}}\begin{bmatrix}1&1&1\\-1&1&-1\\j&j&-j\\-j&j&j\end{bmatrix}$ | — |

Table 20 below illustrates an example of a 4Tx rank 4 UL codebook (a precoding matrix w for four-layer transmission using four antenna ports with transform precoding disabled).

TABLE 20

| TPMI index | W (ordered from left to right in increasing order of TPMI index) | | | |
|---|---|---|---|---|
| 0-3 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ | $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ | $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 4 | $\frac{1}{4}\begin{bmatrix} 1 & 1 & 1 & 1 \\ 1 & -1 & 1 & -1 \\ j & j & -j & -j \\ j & -j & -j & j \end{bmatrix}$ | — | — | — |

The above-described principle may be applied in a similar manner to a rank 4 UL codebook for 4Tx CP-OFDM according to Table 20, and the same two subsampling methods are available.

TPMI set={0, 1, 3}
TPMI set={0, 2, 4}
TPMI set={0}

The last two TPMI set examples are the result of applying sub-sampling aggressively because a higher gain is achieved from an increased number of layers than from a codebook granularity in the case of rank 4, compared to rank 1 and rank 2.

The codebook subsampling method may be configured/applied differently according to a codebook subset that the BS configures based on a coherency capability reported by the UE.

Proposal 2-1. In another method of codebook subsampling, a codebook subset including only odd or even TPMI indexes may be considered.

Proposal 2-2. Codebook subsampling is applied only to a specific rank (e.g., rank 1 or 2), not to the other ranks.

Proposal 2-3. The BS may configure/indicate one of a plurality of patterns for codebook subsampling by higher-layer signaling (e.g., RRC signaling or a MAC-CE).

Proposal 2-4. The BS may explicitly configure/indicate a codebook subsampling method by higher-layer signaling (e.g. RRC signaling or a MAC-CE) in the form of a bitmap.

That is, for example, a codebook subsampling pattern may be indicated by a 62-bit bitmap in the case of 4Tx (CP-OFDM), and by a 9-bit bitmap in the case of 2Tx. In addition, DCI payload is reduced based on the indicated bitmap-based codebook subsampling. That is, for example, when the number of bits set to on, that is, "1" among 62 bits is 30 in 4Tx, a TRI+TPMI is indicated by 5-bit based DCI.

The methods of proposal 2 (e.g., proposal 2/2-1/2-2/2-3/2-4) may be applied independently, or one method (e.g., proposal 2/2-1/2-2/2-3/2-4) may be applied in combination with another method (e.g., proposal 2/2-1/2-2/2-3/2-4).

Proposal 3: Proposal 1 and proposal 2 may be applied to a non-codebook-based configuration method, and extended/applied to SRI indications corresponding to a plurality of TRPs in MTRP non-codebook-based UL transmission.

In an example of proposal 3, rank 2 transmission in Table 21 below (SRI indication for non-codebook based PUSCH transmission, Lmax=2) may be taken as an example. Like proposal 1, a combination of rank and SRS resource may be indicated to TRP 1 by an SRI. In addition, for TRP 2, the same rank as that of TRP 1 may be assumed, and only an SRS combination for the rank may be considered. For example, in the case of 4 SRSs, if Lmax=2 and index 9 (layer 2, 2+3 resource combination) is indicated to TRP 1 by an SRI, an SRS resource combination for rank 2 transmission may be indicated to TRP 2 by only index 4 to 9, with prior knowledge of rank 2 transmission, thereby saving 1 bit. To prevent the size of an SRI field for TRP 2 from changing according to the rank of TRP 1, the size of the SRI field for TRP 2 is determined based on the largest of the numbers of SRS combinations that may be indicated for each rank, as proposed in the codebook-based method.

For example, rank information to be applied TRP-commonly may be indicated by RRC signaling or a MAC-CE.

TABLE 21

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|  |  | 4 | 0, 2 | 4 | 0, 1 |
|  |  | 5 | 1, 2 | 5 | 0, 2 |
|  |  | 6-7 | reserved | 6 | 0, 3 |
|  |  |  |  | 7 | 1, 2 |
|  |  |  |  | 8 | 1, 3 |
|  |  |  |  | 9 | 2, 3 |
|  |  |  |  | 10-15 | reserved |

For UL transmission for MTRPs based on the above proposals, the UE may transmit a UE capability report including the following information to the BS.

Information indicating whether M-TRP transmission is enabled (1-bit signaling): When the feature is reported as enabled (that is, when the UE reports that it may be supported by M-TRPs), the following additional report may be considered.

Information about the total number X of Tx (ports) available for the UE: The number of ports equal to or less than X for each panel may be configured and used for MTRP transmission. The panel may be mapped/identified on an SRS resource or SRS resource set basis.

Information about the number of panels available for simultaneous transmission at the UE: In the case of a plurality of panels, simultaneous multi-panel transmission is possible.

Information about the number of ports for each panel

Information about the total number of SRS resources transmittable from the UE.

Information about TxConfig={NCB, CB}, Coherency capability={Full, Partial, Non}, and Full PowerMode={Mode 0, Mode 1, Mode 2}: The information may be reported and configured panel-commonly.

For example, when X=4, coherency capability=Partial coherent is reported, and the BS configures 4 ports and 2 ports respectively for M=2 (e.g., the number of TRPs), the 4 ports may be operated on the assumption of partial coherent, and the two ports may be operated on the assumption of non-coherent (or full coherent).

For example, when X=4, a coherency capability for each of X=2 and X=4 is reported.

TxConfig={NCB, CB}, Coherency capability={Full, Partial, Non}, and Full PowerMode={Mode 0, Mode 1, Mode 2} are reported panel-commonly, and a configuration is panel-specific (TRP-specific).

Information indicating a TDM transmission or an FDM transmission on a TRP basis.

For example, in the case of an FDM transmission, the UE may report a port combination available for MTRP FDM transmission in UE capability information.

Proposals 1, 2, and 3 (including detailed proposals) of the disclosure may be applied, when a UE having a single panel performs a UL transmission based on repetition in the UL time/frequency/spatial domain. In other words, when information of a plurality of TPMIs/TRIs and/or SRIs is indicated/configured by a single DCI, each TPMI/TRI and/or SRI may be applied to each PUSCH T/F/S TO or an independent PUSCH UL transmission.

A detailed description will be given of a signaling procedure according to an embodiment.

Figure 14:
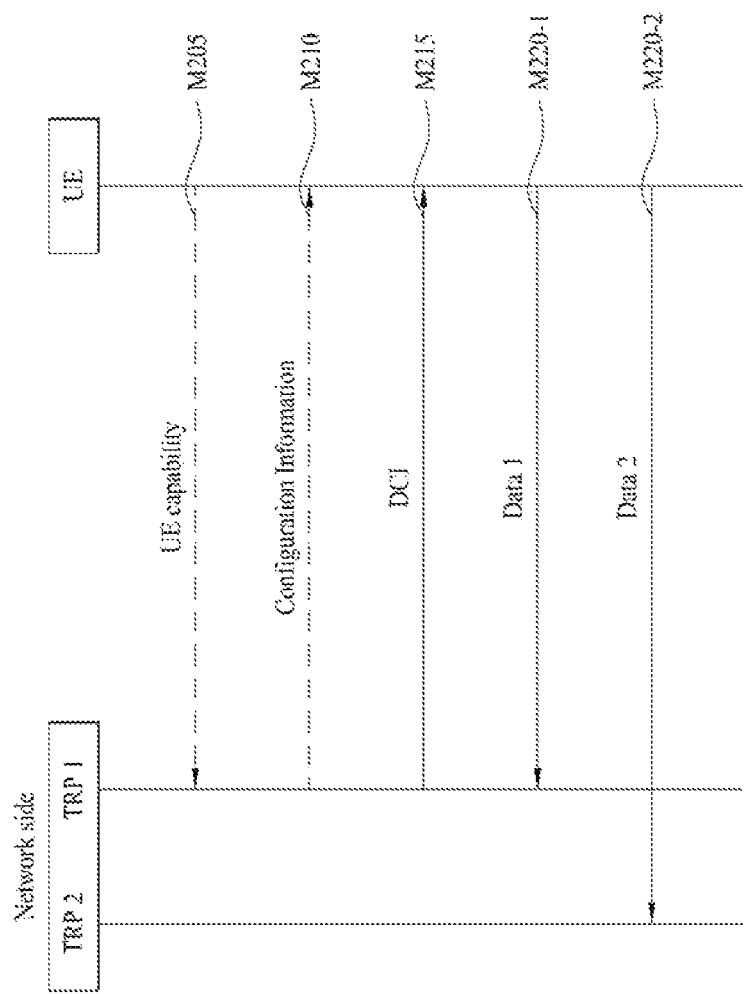
FIG. 14 is a diagram illustrating a signal flow for a method of transmitting the same UL signal to a plurality of TRPs by a UE according to an embodiment.

FIG. 14 is a flowchart illustrating a method of transmitting the same UL signal to a plurality of TRPs by a UE including one or more panels or antennas.

FIG. 14 illustrates a signaling procedure between a network side (e.g., TRP 1 and TRP 2) and a UE in a situation with multiple TRPs (i.e., M-TRPs or multiple cells. The term TRP may be replaced with cell), to which the above-described proposed methods (e.g. proposal 1/proposal 2/proposal 3) are applicable. The UE/network side is merely an example, and may be replaced with various wireless devices and various apparatuses in the later-described drawings. FIG. 14 is only for convenience of description, not limiting the scope of the disclosure. Some step(s) shown in FIG. 14 may be skipped depending on circumstances and/or configurations. While FIG. 14 illustrates an example of single DCI-based M-TRP transmission, the method described in FIG. 14 may be extended to multi-DCI-based M-TRP transmission. In addition, the operations of the network side and the UE in FIG. 14 may be based on the above-described UL transmission/reception operation and multi-TRP related operation.

Referring to FIG. 14, although signaling between two TRPs and a UE is considered for convenience of description, it is obvious that the signaling method may be extended to signaling between multiple TRPs and multiple UEs. In the following description, the network side may be one BS including a plurality of TRPs, and may be one cell including a plurality of TRPs. For example, an ideal/non-ideal backhaul may be established between TRP 1 and TRP 2 serving as the network side. In addition, although the following description is given based on a plurality of TRPs, this may be equally extended to transmission through a plurality of panels. Further, an operation of receiving a signal from TRP1/TRP2 by the UE may be interpreted/described as an operation of receiving a signal from the network side (using/through TRP1/TRP2) in this specification. An operation of transmitting a signal to TRP1/TRP2 by the UE may be interpreted/described as an operation of transmitting a signal from the network side (using/through TRP1/TRP2), and vice versa.

In this specification, a BS may generically refer to an object that transmits/receives data to and from a UE. For example, the BS may conceptually include one or more TPs, one or more TRPs, or the like. A TP and/or TRP may include a panel or a transmission and reception unit of a BS. While the following description is given in the context of "TRP", "TRP" may be replaced with panel, antenna array, cell (e.g., macro cell/small cell/pico cell), TP, or BS (gNB or the like).

As described before, a TRP may be distinguished by information (e.g., an index or ID) about a CORESET group (or CORESET pool). For example, when one UE is configured to perform transmission/reception with a plurality of TRPs (or cells), this may mean that a plurality of CORESET groups (or CORESET pools) are configured for the UE. The CORESET groups (or CORESET pools) may be configured by higher-layer signaling (e.g., RRC signaling or the like).

Specifically, FIG. 14 illustrates signaling in the case where a UE receives a single DCI in an M-TRP situation (or a multi-cell situation. TRP may be replaced with cell/panel. Alternatively, a case in which a plurality of CORESETs(/CORESET groups) configured by one TRP may also be assumed to be an M-TRP situation). In this embodiment, it is assumed that TRP 1 is a representative TRP that transmits DCI.

The UE may transmit UE capability information through/using TRP 1 (and/or TRP 2) to the network side (M205). For example, the UE capability information may include information such as whether the UE supports the afore-described proposed methods (e.g., proposal 1/proposal 2/proposal 3)/a UE capability related to a supported operation.

For example, the UE capability information may include the number of supported antenna ports/the number of ports for each panel/the number of panels available for simultaneous transmission/coherency capability (e.g. nonCoherent, partialNonCoherent, and fullCoherent)/full power transmission capability/supported full Tx mode/supported TPMI group/port switching capability/TX chain related information/whether M-TRP transmission is supported/the number of transmittable SRS resources/multiplexing information (e.g. TDM/FDM/SDM). When the UE capability information is predefined/pre-agreed, the corresponding step may be skipped.

For example, the operation of transmitting the UE capability information to the network side by the UE in step M205 described above may be implemented by a wireless device and a wireless apparatus to be described below. For example, the wireless device and/or apparatus may include at least one processor, and the processor may control at least one transceiver and/or at least one memory to transmit the UE capability information. The at least one transceiver may transmit the UE capability information to the network side.

The UE may receive configuration information related to multi-TRP-based transmission/reception through/using TRP 1 (and/or TRP 2) from the network side (M210). For example, the configuration information may include information related to a configuration of the network side (i.e. a TRP configuration)/resource information related to multi-TRP-based transmission and reception/system information (SI)/scheduling information/PUSCH-Config (refer to 3GPP TS 38.331 PUSCH Config and the above-described UL transmission/reception operation). For example, the configuration information may include information related to CB subset restriction/CB subsampling (e.g. CB subset restriction/CB subsampling pattern/bitmap). In this case, the configuration information may be transmitted by higher-layer signaling (e.g., RRC signaling, a MAC-CE, or the like). In addition, when the configuration information is predefined or preconfigured, the corresponding step may be skipped. For example, information necessary for the operations described in the above-described proposed methods (e.g. proposal 1/proposal 2/proposal 3) may be included in the configuration information.

For example, the operation of receiving the configuration information related to multi-TRP-based transmission/reception from the network side by the UE in step M210 described above may be implemented by various types of wireless devices and apparatuses to be described below. For example, a wireless device and/or a wireless apparatus may include at least one processor, and the processor may control at least one transceiver and/or at least one memory to receive the information related to multi-TRP-based transmission/reception. The at least one transceiver may receive the information related to multi-TRP-based transmission/reception from the network side.

The UE may receive DCI through/using TRP 1 from the network side (M215). The DCI may be received on a control channel (e.g. PDCCH). For example, the DCI may include information for scheduling a UL transmission (e.g. UL scheduling information) and precoding-related information. For example, the precoding-related information may include information about an SRI/TPMI/TRI/MCS. For example, the DCI may be DCI format 0-1 or DCI format 0-0 (refer to the above-described UL transmission/reception operation). For example, the network side may simultaneously perform PUSCH scheduling for each of multiple cells by the DCI.

For example, as described in the above-described proposed methods (e.g. proposal 1/proposal 2/proposal 3) that consider transmission and reception through a plurality of panels/ports, a TRI/TPMI/SRI may be indicated/configured by the network side. For example, it may be assumed that a TRI is indicated for a selected one (e.g. a first TRP (e.g., determined based on an index such as CoresetID/TCI state) of a plurality of TRPs, and the same TRI value as for the selected TRP is applied to the other TRPs. For example, a TRP-common/TRP-specific TRI may be indicated by a higher-layer configuration, and only TPMIs for the respective TRPs may be indicated by DCI. For example, ranks may be determined for the other TRPs based on a rank (referred to as a reference rank) of a TRP in the best channel environment. For example, the ranks of the other TRPs may be set to be less than the reference rank or predefined values may be used as the ranks. For example, the size of a TMPI field may be determined based on the largest of the numbers of TPMIs for the respective ranks. For example, a rank may be indicated for one (e.g., the first TRP (e.g., determined based on CoresetID/TCI state) of the plurality of TRPs, ranks may not be indicated for the other TRPs, and an SRS resource combination for a corresponding rank transmission may be indicated.

For example, like the methods of proposal 2, CB subset restriction/CB subsampling may be configured based on DCI. For example, a CB subset may be configured based on the index (e.g. odd/even) of a TPMI. For example, subsampling may be applied only to a specific rank. For example, subsampling may be performed based on co-phasing between ports/port groups.

In addition, for example, the network side may perform a procedure of acquiring information about a UL channel state (e.g., UL CSI) from the UE before scheduling a UL transmission. For example, the information about the channel state between the UE and the network side may be acquired based on the above-described CSI-related operation.

For example, the operation of receiving DCI from the network side by the UE in step M215 described above may be implemented by a wireless device and a wireless apparatus to be described below. For example, the wireless device and/or the wireless apparatus may include at least one processor, and the processor may control at least one transceiver and/or at least one memory to receive DCI. The at least one transceiver may receive the DCI from the network side.

The UE may transmit Data 1 to the network side through/using TRP 1 (M220-1). Further, the UE may transmit Data 2 to the network side through/using TRP 2 (M220-2). The data (e.g. Data 1 and Data 2) may be transmitted on a data channel (e.g. PUSCH). Steps M220-1 and M220-2 may be performed simultaneously or one may be performed earlier than the other. For example, Data1/Data2 may have been precoded, and may include an RS (e.g. DMRS) for data decoding. For example, Data 1 and/or Data 2 may be transmitted based on the above-described proposed methods (e.g. proposal 1/proposal 2/proposal 3).

For example, the operation of transmitting Data 1/Data 2 to the network side by the UE in step M220-1/M220-2 described above may be implemented by a wireless device and a wireless apparatus to be described below. For example, the wireless device and/or the wireless apparatus may include at least one processor, and the processor may control at least one transceiver and/or at least one memory to transmit Data 1/Data 2. The at least one transceiver may transmit Data 1/Data 2 to the network side.

As described above, the network side/UE signaling procedure and detailed operations (e.g. proposal 1/proposal 2/proposal 3) for the procedure according to this embodiment may be implemented by a wireless device and a wireless apparatus to be described below. For example, the network side (e.g. TRP 1/TRP 2) may correspond to a first wireless device (or a first wireless apparatus), and the UE may correspond to a second wireless device (or a second wireless apparatus), and in some cases, vice versa.

For example, the above-described network side/UE signaling procedure and detailed operations (e.g. proposal 1/proposal 2/proposal 3) for the procedure may be processed by at least one processor included in a wireless device and/or a wireless apparatus. The above-described network side/UE signaling procedure and detailed operations (e.g. proposal 1/proposal 2/proposal 3) may be stored in the form of instructions/programs (e.g. instructions or executable code) in at least one memory.

Figure 15:
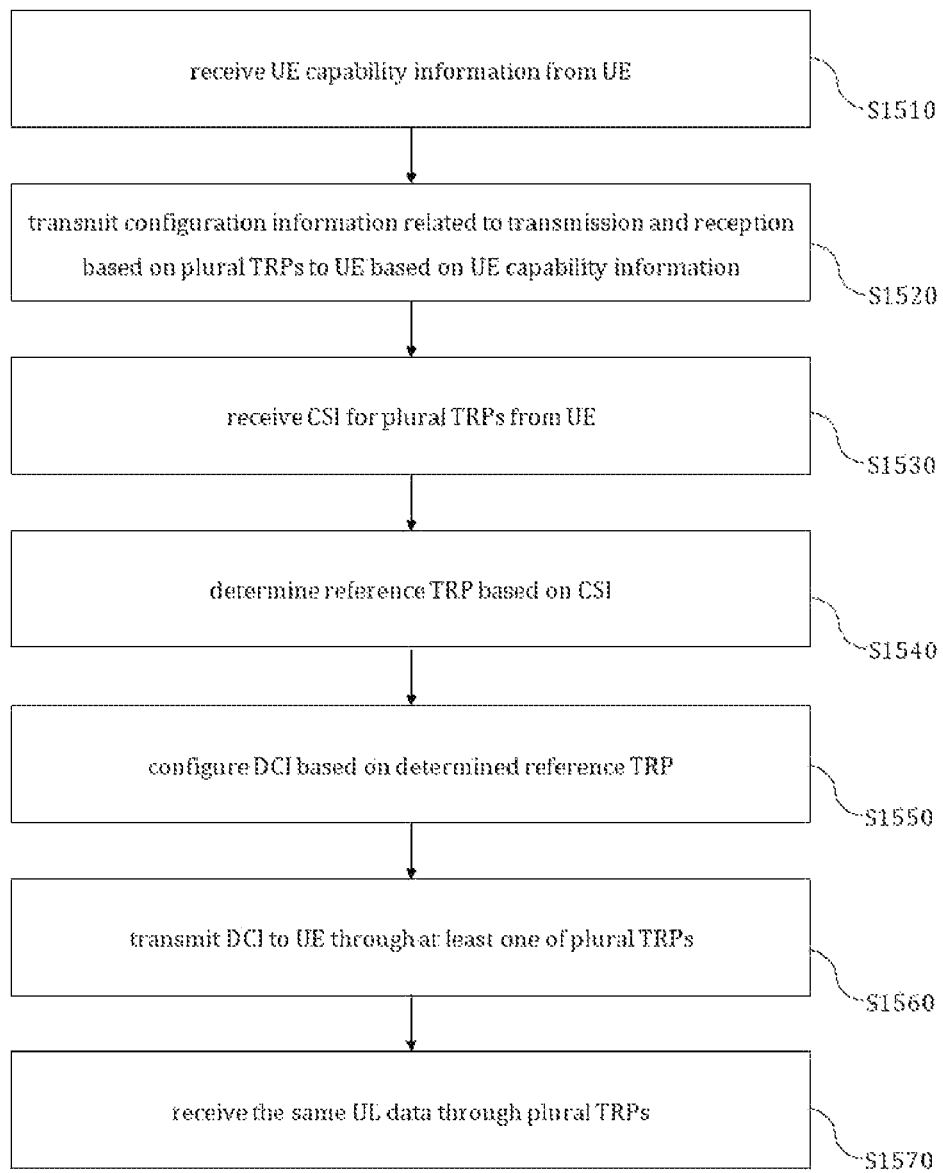
FIG. 15 is a flowchart illustrating a method of receiving a UL signal through a plurality of TRPs by a network according to an embodiment.

FIG. 15 is a flowchart illustrating a method of receiving a UL signal through a plurality of TRPs by a network side according to an embodiment.

Referring to FIG. 15, the network may receive UE capability information from a UE (S1510).

The network may transmit configuration information related to transmission/reception based on a plurality of TRPs to the UE based on the UE capability information (S1520).

The network may receive CSI for the plurality of TRPs from the UE (S1530).

The network may determine any one of the plurality of TRPs as a reference TRP based on the CSI (S1540).

The network may configure DCI based on the determined reference TRP (S1550). Fields included in the DCI may be configured with different values depending on whether they are codebook-based or non-codebook-based. For example, in the case of a codebook-based UL transmission, the DCI may include TPMI fields, and in the case of a non-codebook-based UL transmission, the DCI may include SRI fields. For example, the bit size of a TPMI field included in the DCI may be determined based on a maximum value of the number of TPMIs for each rank corresponding to a reference TPI. For example, in the case of a non-codebook-based UL transmission, a first SRI field value among a plurality of SRI field values in DCI may be determined by bit mapping of a combination of a TRI corresponding to the reference TRP (the first TRP) and an SRS resource corresponding to the first TRP, and the remaining SIR field values except for the first SRI field value may be determined only by bitmapping of a combination of SRS resources corresponding to each of the second to $n^{th}$ TRPs except for the selected first TRP. The sizes of the other SRI fields may be determined based on the largest of the numbers of SRS resource combinations that may be indicated for the respective ranks corresponding to the TRI of the reference TRP.

The network may transmit the DCI to the UE through at least one of the plurality of TRPs (S1560).

The network may receive UL data through the plurality of TRPs (S1570). The UE may transmit the same UL data through the plurality of TRPs through the same number of antenna ports.

In the embodiment of FIG. 15, the network may include at least one BS, and the plurality of TRPs may be provided in one BS or different BSs. When the plurality of TRPs are provided in different BSs, the BSs may exchange information with each other via a backhaul link.

While it has been described that the UE transmits UL data to the plurality of TRPs through the same number of antenna ports in the above embodiment, this is merely an embodiment. According to another embodiment, the UE may be equipped with a plurality of panels including different numbers of antenna ports. In this case, when transmitting UL data through the plurality of TRPs, the UE may transmit the UL data using a different number of antenna ports for each TRP.

Figure 16:
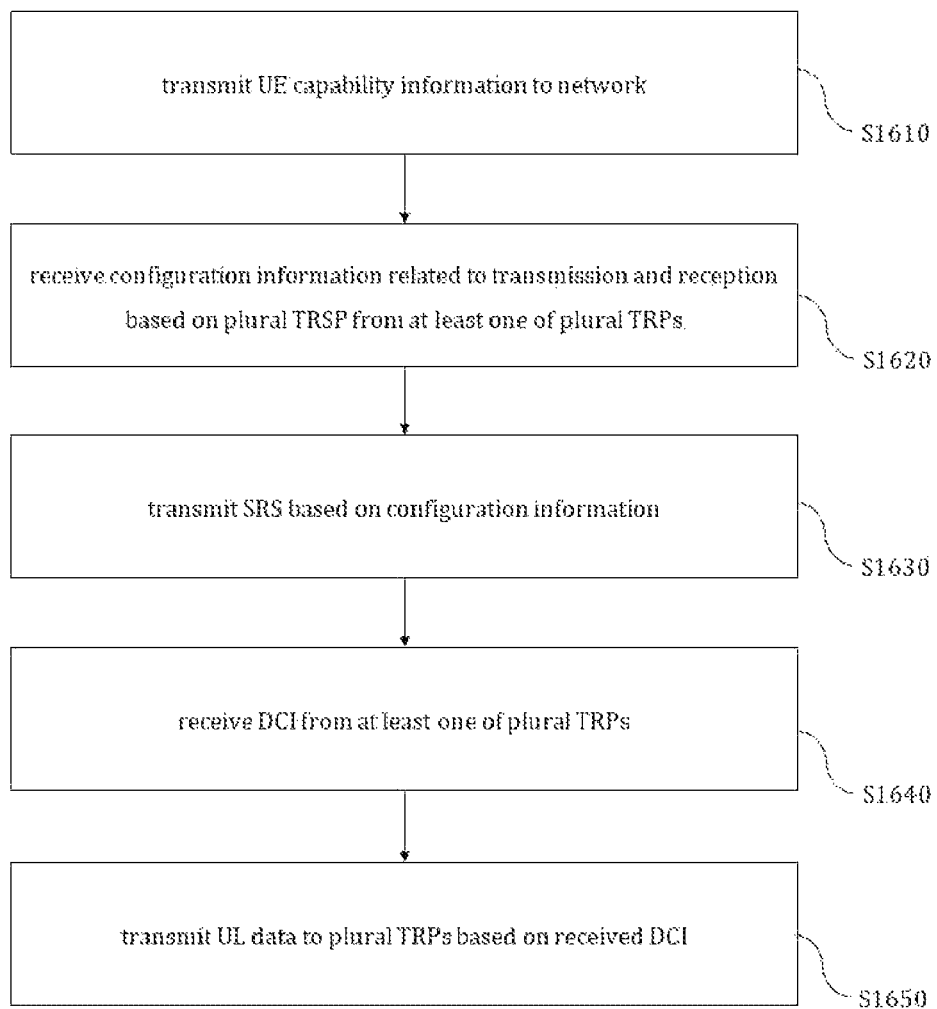
FIG. 16 is a flowchart illustrating a method of transmitting a UL signal to a plurality of TRPs by a UE according to an embodiment.

FIG. 16 is a flowchart illustrating a method of transmitting a UL signal to a plurality of TRPs by a UE according to an embodiment.

Referring to FIG. 16, the UE may transmit UE capability information to the network (S1610).

The UE may receive configuration information related to transmission/reception based on a plurality of TRPs from the network (S1620). The network may determine the configuration information related to transmission/reception based on the plurality of TRPs based on the UE capability information.

The UE may transmit an SRS based on the configuration information (S1630).

The network acquires UL CSI for the plurality of TRPs based on an SRS received from the UE, and determine any one of the plurality of TRPs as a reference TRP based on the obtained UL CSI. The network may configure DCI based on the determined reference TRP.

The UE may receive DCI from the network (S1640). The DCI may be equally received from at least one of the plurality of TRPs. Fields included in the DCI may be configured with different values depending on whether they are codebook-based or non-codebook-based. For example, in the case of a codebook-based UL transmission, the DCI may include TPMI fields, and in the case of non-codebook-based UL transmission, the DCI may include SRI fields. For example, the bit size of a TPMI field included in the DCI may be determined based on a maximum value of the number of TPMIs for each rank corresponding to a reference TPI. For example, in the case of a non-codebook-based UL transmission, a first SRI field value among a plurality of SRI field values constituting DCI may be determined by bit mapping of a combination of a TRI corresponding to the reference TRP (the first TRP) and an SRS resource corresponding to the first TRP, and the remaining SIR field values except for the first SRI field value may be determined only by bitmapping of a combination of SRS resources corresponding to each of the second to $n^{th}$ TRPs except for the selected first TRP. The sizes of the other SRI fields may be determined based on the largest of the numbers of SRS resource combinations that may be indicated for the respective ranks corresponding to the TRI of the reference TRP.

The UE may transmit UL data to the plurality of TRPs based on the received DCI (S1650). The UE may transmit the same UL data through the plurality of TRPs through the same number of antenna ports.

Figure 17:
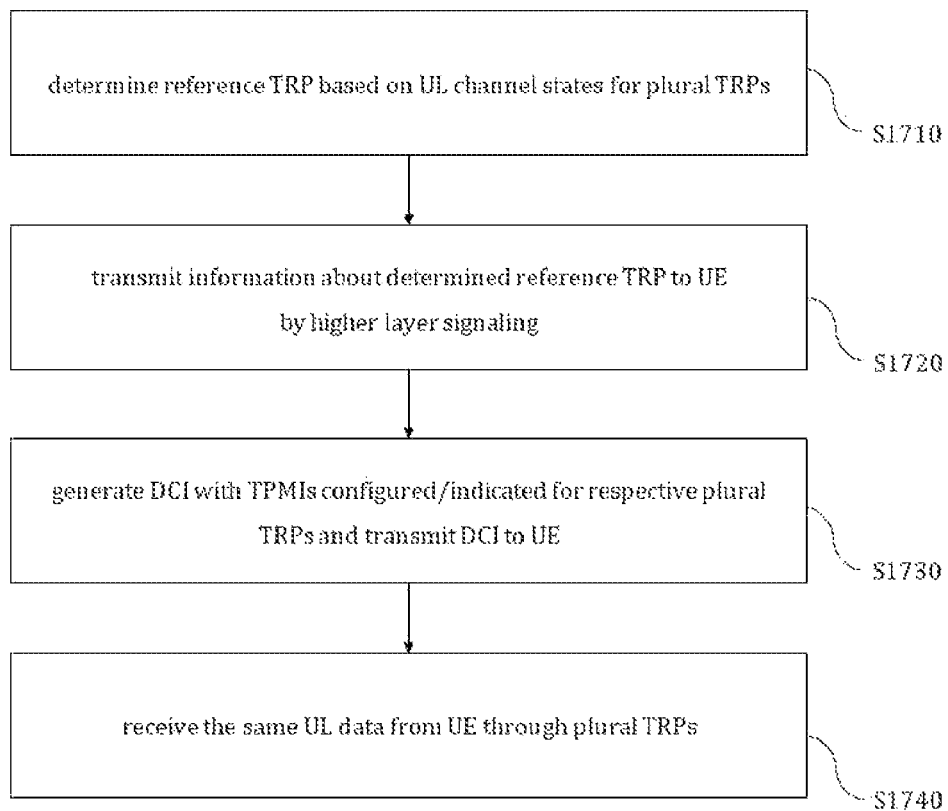
FIG. 17 is a flowchart illustrating a method of receiving a UL signal through a plurality of TRPs by a network according to another embodiment.

FIG. 17 is a flowchart illustrating a method of receiving a UL signal through a plurality of TRPs by a network according to an embodiment.

Referring to FIG. 17, the network may determine a reference TRP based on UL channel states with a plurality of TRP. The UL channel states with the plurality of TRPs may be measured based on an SRS received from the UE by each TRP. The network may determine a TRP in the best UL channel state as the reference TRP. For example, the UE may perform a codebook-based or non-codebook-based UL transmission by applying a received TPI corresponding to the reference TRP commonly to all of the plurality of TRPs.

The network may transmit information about the determined reference TRP to the UE by higher-layer signaling (S1720). The information about the reference TRP may include information about the TPI corresponding to the reference TRP.

The network may generate DCI with a TPMI indicated/configured for each of the plurality of TRPs and transmit the DCI to the UE (S1730). That is, the DCI according to this embodiment may include only the TPMI for each of the plurality of TRPs, indicating/configuring TPI information for none of the TRPs. Accordingly, the overhead of DCI payload may be reduced.

The network may receive the same UL data from the UE through the plurality of TRPs (S1740). The UE may perform a codebook-based UL data transmission based on the information about the reference TRP received by higher-layer signaling and the TPMI for each of the plurality of TRPs, received in the DCI.

Figure 18:
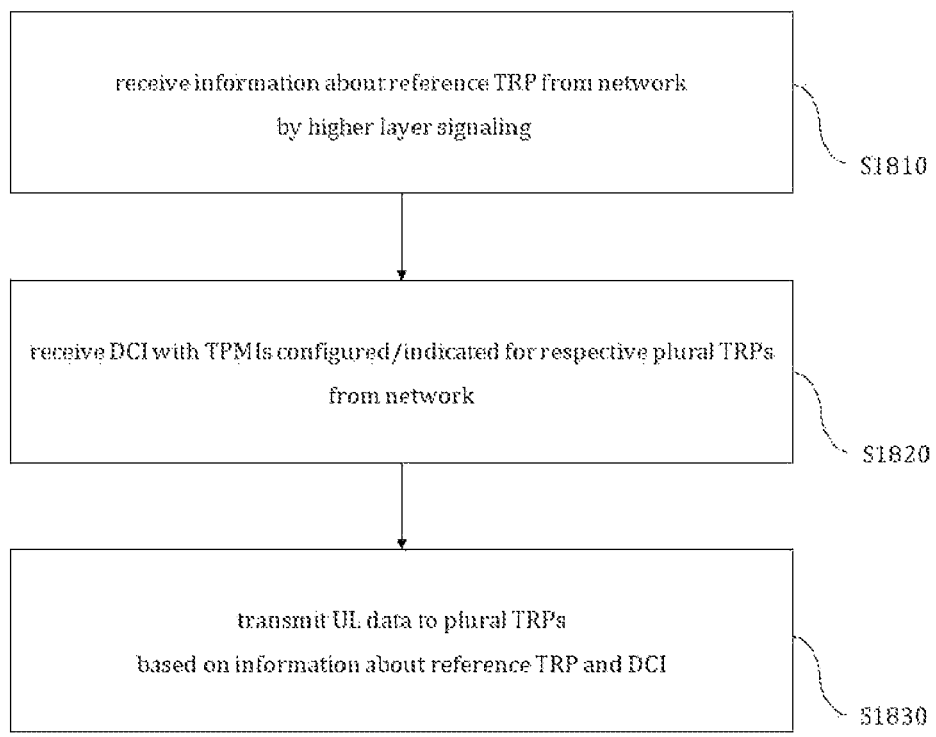
FIG. 18 is a flowchart illustrating a method of transmitting a UL signal to a plurality of TRPs by a UE according to another embodiment.

FIG. 18 is a flowchart illustrating a method of transmitting a UL signal to a plurality of TRPs by a UE according to an embodiment.

Referring to FIG. 18, the UE may receive information about a reference TRP determined by the network by higher-layer signaling (S1810).

The UE may transmit DCI with a TPMI and/or an SRI indicated/configured for each of the plurality of TRPs to the UE (S1820). That is, the DCI according to this embodiment may not include TPI information for the plurality of TRPs. Accordingly, the overhead of DCI payload is advantageously reduced.

The UE may transmit UL data to the plurality of TRPs based on the information about the reference TRP and the DCI (S1830). The UE may transmit the same UL data to the plurality of TRPs through the same number of antennas or antenna groups.

A detailed description of each step in FIGS. 15 to 18 is replaced with the description of proposal 1 to proposal 3 and the description of a signaling scenario in FIG. 4.

It is obvious that each of the examples of the proposed methods may also be included as one of various embodiments of the disclosure, and thus each example may be regarded as a kind of proposed method. Although the proposed methods may be implemented independently, some of the proposed methods may be combined (or merged) and implemented. It may be regulated that the BS indicates whether to apply the proposed methods to the UE by a pre-defined signal (e.g., a physical layer signal or a higher-layer signal).

Example of Communication System to which the Disclosure is Applied

The various descriptions, functions, procedures, proposals, methods, and/or operational flowcharts of the disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 19:
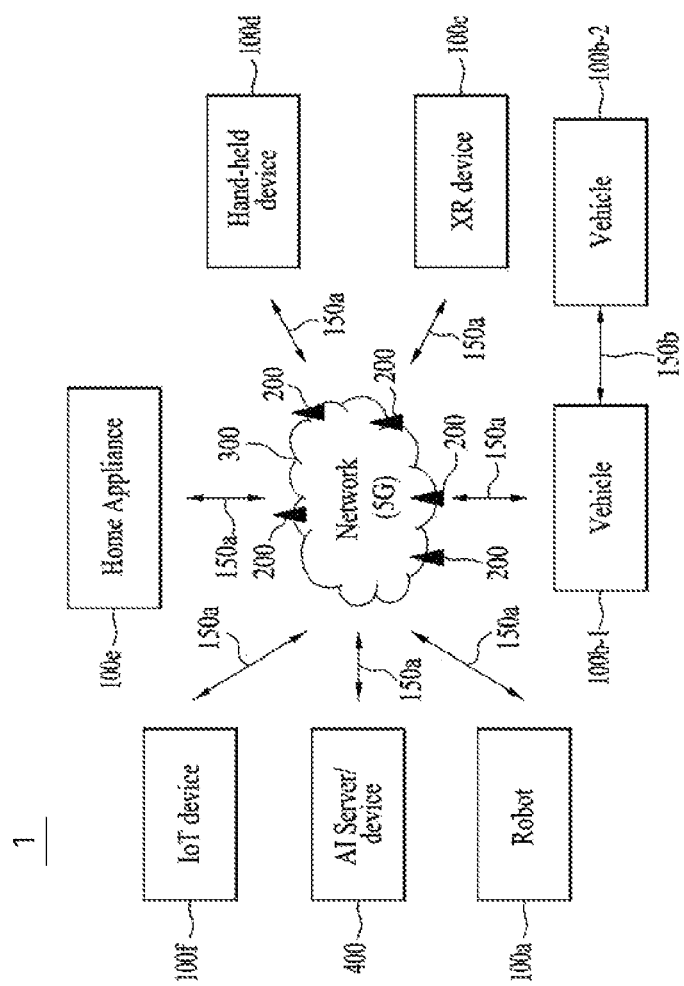
FIG. 19 illustrates a communication system applied to the disclosure.

FIG. 19 illustrates a communication system 1 applied to the disclosure.

Referring to FIG. 19, a communication system 1 applied to the disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (JAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the disclosure.

A network according to an embodiment may provide various communication services in conjunction with wireless devices through a wired/wireless integrated network. The network according to an embodiment may be implemented to enable transmission/reception through a plurality of TRPs, and may refer to a network including a BS or a BS itself.

The network may include at least one processor and at least one memory, and further include at least one transceiver. The processor may be configured to control the memory and/or the transceiver, and implement the descriptions, functions, procedures, proposals, methods, and/or operational flowcharts disclosed herein. For example, the processor may generate first information/signal by processing information in the memory, and then transmit a signal including the first information/signal through the transceiver. In addition, after receiving a signal including second information/signal through the transceiver, the processor may store information obtained by processing the second information/signal in the memory. The memory may be connected to the processor and store various types of information related to the operations of the processor. For example, the memory may store software code including instructions for performing some or all of the processes controlled by the processor, or for performing the descriptions, functions, procedures, suggestions, methods, and/or operational flowcharts disclosed herein. The processor and the memory may be part of a communication modem/circuit/chipset designed to implement a wired communication technology. The transceiver may be connected to the processor and transmit and/or receive signals through a wired network. The transceiver may include a transmitter and/or a receiver. Transceiver may be used interchangeably with transmission and reception unit.

The network may perform an operation of receiving a UL signal through a plurality of TRPs according to embodiments for performing a method of transmitting and receiving a UL signal through a plurality of TRPs described with reference to FIGS. 13 to 18. For example, the operation includes transmitting DCI including first to $n^{th}$ field values to at least one of the plurality of TRPs and receiving the same UL data through the plurality of TRPs, the first field value among the first to $n^{th}$ field values may be determined based on a TRI and a TPMI corresponding to the first TRP selected from among the plurality of TRPs, and the second to $n^{th}$ field values may be determined based on second to $n^{th}$ TPMIs corresponding respectively to the remaining second to $n^{th}$ TRPs except for the selected first TRP.

Example of Wireless Devices to which the Disclosure is Applied

Figure 20:
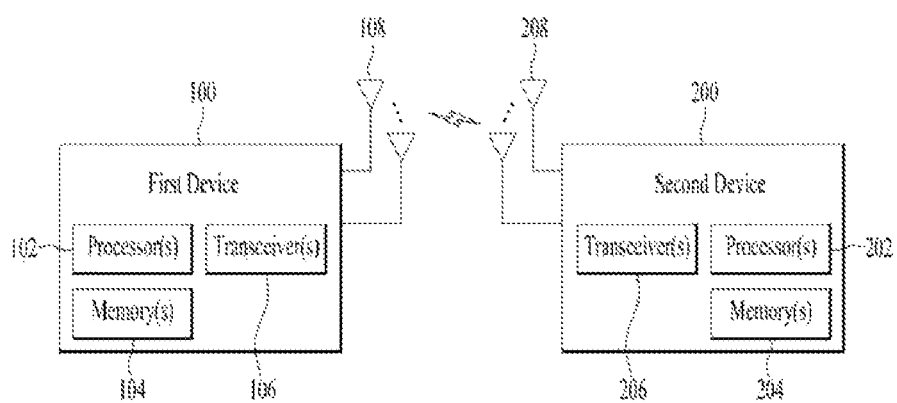
FIG. 20 illustrates wireless devices applicable to the disclosure.

FIG. 20 illustrates wireless devices applicable to the disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the disclosure, the wireless device may represent a communication modem/circuit/chip.

Specifically, the UE or vehicle may include the processor 102 connected to the RF transceiver, and the memory 104. The memory 104 may include at least one program for performing operations related to the embodiments described with reference to FIGS. 13 to 18.

The processor 102 may perform an operation of transmitting a UL signal through a plurality of TRPs according to the embodiments of performing a method of transmitting/receiving a UL signal based on a plurality of TRPs, described with reference to FIGS. 13 to 18, based on a program stored in the memory 104.

Alternatively, a chipset including the processor 102 and the memory 104 may be configured. In this case, the chipset may include at least one processor, and at least one memory which is operatively connected to at least one processor, and when executed, causes the at least one processor to perform an operation. The processor 102 may perform an operation of transmitting a UL signal through a plurality of TRPs according to the embodiments of performing a method of transmitting/receiving a UL signal based on a plurality of TRPs, described with reference to FIGS. 13 to 18, based on a program stored in the memory 104.

Alternatively, a computer-readable storage medium including at least one computer program causing the at least one processor to perform a program may be provided.

The processor 102 may perform an operation of transmitting a UL signal through a plurality of TRPs according to the embodiments of performing a method of transmitting/receiving a UL signal based on a plurality of TRPs, described with reference to FIGS. 13 to 18, based on a program stored in the memory 104. The operation may include receiving DCI including first to $n^{th}$ field values, and transmitting the same UL data to the plurality of TRPs using the same number of antenna ports based on the DCI. Among the first to $n^{th}$ field values, the first field value may be determined based on a TRI and a TPMI corresponding to a first TRP selected from among the plurality of TRPs, and the second to $n^{th}$ field values may be determined based on second to $n^{th}$ TPMIs corresponding respectively to the remaining second to $n^{th}$ TRPs except for the selected first TRP.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the disclosure, the wireless device may represent a communication modem/circuit/chip.

The processor 202 may perform an operation of transmitting a UL signal through a plurality of TRPs according to the embodiments of performing a method of transmitting/receiving a UL signal based on a plurality of TRPs, described with reference to FIGS. 13 to 18, based on a program stored in the memory 204.

Alternatively, a chipset including the processor 202 and the memory 204 may be configured. In this case, the chipset may include at least one processor, and at least one memory which is operatively connected to at least one processor, and when executed, causes the at least one processor to perform an operation. The processor 102 may perform an operation of receiving a UL signal through a plurality of TRPs according to the embodiments of performing a method of transmitting/receiving a UL signal based on a plurality of TRPs, described with reference to FIGS. 12 to 18, based on a program stored in the memory 104. The operation may include transmitting DCI including first to $n^{th}$ field values, and receiving the same UL data to the plurality of TRPs. Among the first to $n^{th}$ field values, the first field value may be determined based on a TRI and a TPMI corresponding to a first TRP selected from among the plurality of TRPs, and the second to $n^{th}$ field values may be determined based on second to $n^{th}$ TPMIs corresponding respectively to the remaining second to $n^{th}$ TRPs except for the selected first TRP.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Wireless Devices to which the Disclosure is Applied

Figure 21:
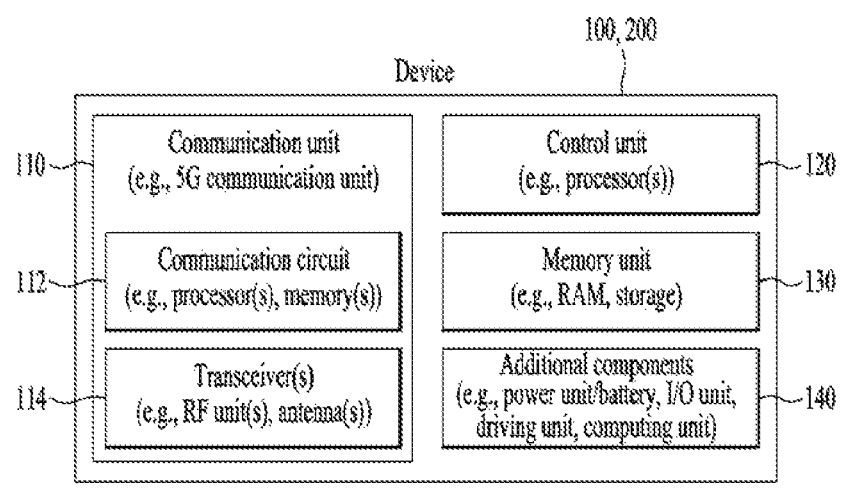
FIG. 21 illustrates another example of a wireless device applicable to the disclosure.

FIG. 21 illustrates another example of a wireless device applied to the disclosure.

The wireless device may be implemented in various forms according to a use-case/service (refer to FIG. 19).

Referring to FIG. 21, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 22:
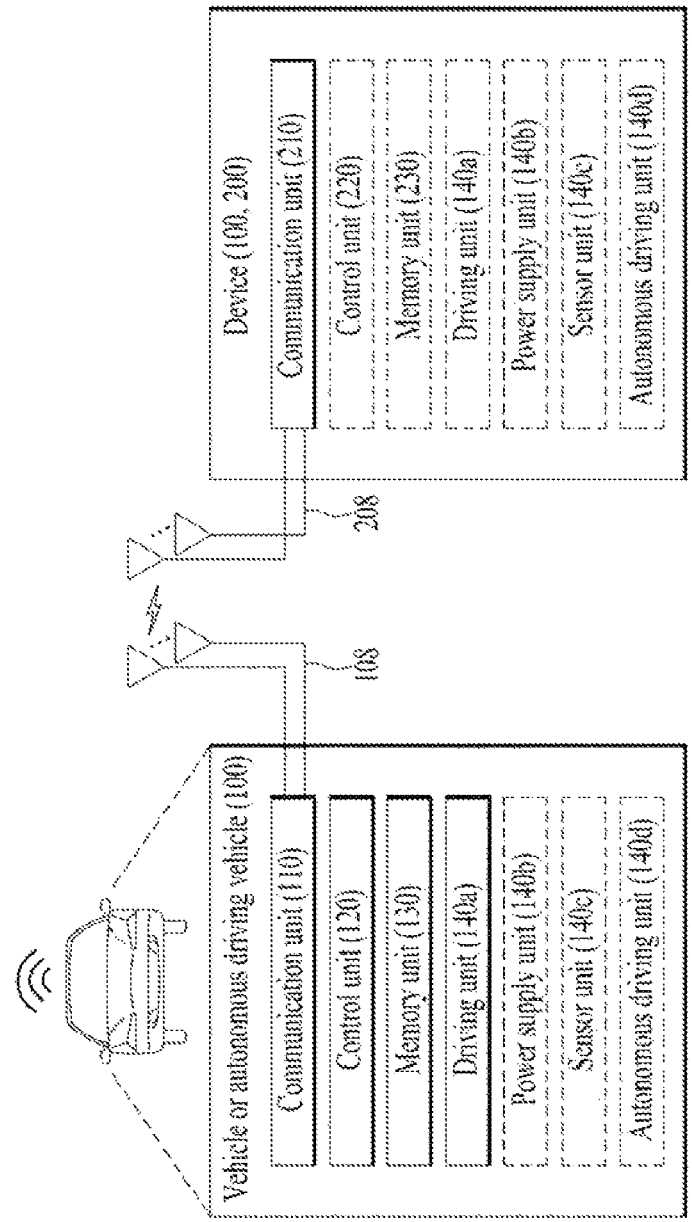
FIG. 22 illustrates a vehicle or an autonomous driving vehicle applied to the disclosure.

Example of a Vehicle or an Autonomous Driving Vehicle to which the Disclosure is Applied FIG. 22 illustrates a vehicle or an autonomous driving vehicle applied to the disclosure. The vehicle or autonomous driving vehicle may be implemented by a mobile robot, a car, a train, a manned/unmanned Aerial Vehicle (AV), a ship, etc.

Referring to FIG. 22, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The antenna unit 108 may include a plurality of distributed antennas distributed and arranged in the vehicle. The position of the distributed antennas arranged in the vehicle may be different depending on the vehicle. A reference point indicating a relative position in the vehicle of the distributed antenna may be predefined and may be recorded and maintained in a memory included in the vehicle. In this case, the reference point may be differently defined according to the vehicle.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control).

In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, a wireless communication technology implemented in the wireless devices XXX and YYY in the disclosure may include Narrowband Internet of Things for low power communication as well as LTE, NR, and 6G. In this case, for example, the NB-IoT technology may be an example of a Low Power Wide Area Network (LPWAN) technology and may be implemented in standards such as LTE Cat NB1 and/or LTE Cat NB2, and is not limited to the above-described name. Additionally or alternatively, the wireless communication technology implemented in the wireless devices XXX and YYY may be performed based on the LTE-M technology. In this case, for example, the LTE-M technology may be an example of the LPWAN technology and may be called various terms such as enhanced Machine Type Communication (eMTC). For example, the LTE-M technology may be implemented as at least one of various standards such as 1) LTE CAT (LTE Category) 0, 2) LTE Cat M1, 3) LTE Cat M2, 4) LTE non-BL (non-Bandwidth Limited), 5) LTE-MTC, 6) LTE Machine Type Communication, and/or 7) LTE M and may not be limited to the aforementioned terms. Additionally or alternatively, the wireless communication technology implemented in the wireless devices XXX and YYY according to the disclosure may include at least one of ZigBee, Bluetooth, or Low Power Wide Area Network (LPWAN) in consideration of low power communication and is not limited to the aforementioned terms. For example, the ZigBee technology may generate personal area networks (PAN) associated with small/low-power digital communication based on various. The embodiments of the disclosure described above are combinations of elements and features of the disclosure. The elements or features may be considered selective unless otherwise mentioned. Each element or feature may be practiced without being combined with other elements or features. Further, an embodiment of the disclosure may be constructed by combining parts of the elements and/or features. Operation orders described in embodiments of the disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the disclosure or included as a new claim by a subsequent amendment after the application is filed.

In this document, the embodiments of the disclosure have been described centering on a data transmission and reception relationship between a UE and a BS. The transmission and reception relationship may be equally/similarly extended to signal transmission/reception between a UE and a relay or between a BS and a relay. In this document, a specific operation described as performed by the BS may be performed by an upper node of the BS as necessary. In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary. In addition, the terminal may be replaced with terms such as User Equipment (UE), Mobile Station (MS), and Mobile Subscriber Station (MSS).

The embodiments according to the disclosure may be implemented by various means, for example, hardware, firmware, software, or a combination thereof. In a hardware configuration, the embodiments of the disclosure may be achieved by at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the disclosure may be implemented in the form of a module, a procedure, a function, etc. for performing the above-described functions or operations. Software code may be stored in the memory and executed by the processor. The memory is located at the interior or exterior of the processor and may transmit and receive data to and from the processor via various known means.

Various embodiments of the disclosure may be carried out in other specific ways than those set forth herein without departing from the spirit and essential characteristics of the disclosure. The above implementations are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the disclosure are applicable to an apparatus capable of performing UL transmission/reception through a plurality of TRPs.

The invention claimed is:

1. A method of transmitting an uplink signal by a user equipment (UE), the method comprising:
receiving a single downlink control information (DCI) format including first and second fields related to codebook based transmissions; and
transmitting multiple physical uplink shared channels (PUSCHs) based on the single DCI format,
wherein the first field includes a value indicating i) a transmit precoder matrix indicator (TPMI) and ii) a number of layers,
wherein the second field includes a value indicating a TPMI based on a same number of layers indicated by the first field, and
wherein a size of the second field is determined based on a largest number of TPMIs among respective numbers of TPMIs for numbers of layers.

2. The method according to claim 1, further comprising:
transmitting capability information regarding the UE to at least one of a plurality of transmission reception points (TRPs); and receiving configuration information related to transmission and reception based on the plurality of TRPs.

3. The method according to claim 2, wherein the configuration information related to the transmission and reception based on the plurality of TRPs includes information related to codeblock subset restriction or codeblock subsampling.

4. The method according to claim 3,
wherein a code block subset is configured based on a TPMI index value, and
wherein the codeblock subsampling is performed based on a rank or based on co-phasing between ports/port groups.

5. The method according to claim 1, wherein each of the multiple PUSCHs is determined based on a transmission configuration indicator (TCI) state identifier (ID) associated with a transmission reception point (TRP).

6. The method according to claim 5, further comprising:
transmitting a sounding reference signal (SRS) to a plurality of TRPs.

7. A user equipment (UE) for transmitting an uplink signal, the UE comprising:
at least one transceiver;
at least one processor; and
at least computer memory storing instructions that cause the at least one processor to perform operations comprising:
receiving a single downlink control information (DCI) format including first and second fields related to codebook based transmissions; and
transmitting multiple physical uplink shared channels (PUSCHs) based on the single DCI format,
wherein the first field value includes a value indicating i) a transmit precoder matrix indicator (TPMI) and ii) a number of layers,
wherein the second field includes a value indicating a TPMI based on a same number of layers indicated by the first field, and
wherein a size of the second field is determined based on a largest number of TPMIs among respective numbers of TPMIs for numbers of layers.

8. The UE according to claim 7, wherein the operations further comprise:
transmitting capability information regarding the UE to at least one of a plurality of transmission reception points (TRPs); and
receiving configuration information related to transmission and reception based on the plurality of TRPs.

9. The UE according to claim 8, wherein the configuration information related to the transmission and reception based on the plurality of TRPs includes information related to codeblock subset restriction or codeblock subsampling.

10. The UE according to claim 9,
wherein a code block subset is configured based on a TPMI index value, and
wherein the codeblock subsampling is performed based on a rank or based on co-phasing between ports/port groups.

11. The UE according to claim 7, wherein each of the multiple PUSCHs is determined based on a transmission configuration indicator (TCI) state identifier (ID) associated with a transmission reception point (TRP).

12. The UE according to claim 11, wherein the operations further comprise:
transmitting a sounding reference signal (SRS) to a plurality of TRPs.

13. A base station (BS) for receiving an uplink signal, the BS comprising:
at least one transceiver;
at least one processor; and
at least computer memory storing instructions that causes the at least one processor to perform operations comprising:
transmitting, to a user equipment (UE), a single downlink control information (DCI) format including first to second fields related to codebook based transmissions; and
receiving, from the UE, multiple physical uplink shared channels (PUSCHs) based on the single DCI format, and
wherein the first field includes a value indicating i) a transmit precoder matrix indicator (TPMI) and ii) a number of layers,
wherein the second field includes a value indicating a TPMI based on a same number of layers indicated by the first field, and
wherein a size of the second field is determined based on a largest number of TPMIs among respective numbers of TPMIs for numbers of layers.

14. The BS according to claim 13, wherein the operations further comprise:
receiving capability information regarding the UE via at least one of a plurality of transmission reception points (TRPs); and
transmitting configuration information related to transmission and reception based on the plurality of TRPs.

15. The BS according to claim 14, wherein the configuration information related to the transmission and reception based on the plurality of TRPs includes information related to codeblock subset restriction or codeblock subsampling.

16. The BS according to claim 13, wherein each of the multiple PUSCHs is determined based on a transmission configuration indicator (TCI) state identifier (ID) associated with a transmission reception point (TRP).

17. The BS according to claim 16, wherein the operations further comprise:
receiving a sounding reference signal (SRS) through a plurality of TRPs.

* * * * *